(12) United States Patent
Maniwa et al.

(10) Patent No.: US 11,237,259 B2
(45) Date of Patent: Feb. 1, 2022

(54) RADAR DEVICE

(71) Applicant: Mitsubishi Electric Corporation, Tokyo (JP)

(72) Inventors: Kazuaki Maniwa, Tokyo (JP); Satoshi Kageme, Tokyo (JP); Teruyuki Hara, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 171 days.

(21) Appl. No.: 16/497,686

(22) PCT Filed: May 10, 2017

(86) PCT No.: PCT/JP2017/017710
§ 371 (c)(1),
(2) Date: Sep. 25, 2019

(87) PCT Pub. No.: WO2018/207288
PCT Pub. Date: Nov. 15, 2018

(65) Prior Publication Data
US 2020/0191934 A1 Jun. 18, 2020

(51) Int. Cl.
*G01S 13/28* (2006.01)
*G01S 7/288* (2006.01)

(52) U.S. Cl.
CPC ............ *G01S 13/288* (2013.01); *G01S 7/288* (2013.01); *G01S 7/2883* (2021.05); *G01S 13/286* (2013.01)

(58) Field of Classification Search
None
See application file for complete search history.

(56) References Cited

U.S. PATENT DOCUMENTS

| 9,229,102 B1 | 1/2016 | Wright et al. |
| 2005/0099330 A1* | 5/2005 | Hausner ................. G01S 7/412 342/22 |
| 2013/0088380 A1 | 4/2013 | Isoda |

OTHER PUBLICATIONS

Extended European Search Report for European Application No. 17909084.0, dated Jan. 28, 2020.
Phelan et al., "Design and performance of an ultra-wideband stepped-frequency radar with precise frequency control for landmine and IED detection," Proc. of SPIE, vol. 0977, 2014, pp. 907708-1 to 907708-12.

(Continued)

*Primary Examiner* — Whitney Moore
(74) *Attorney, Agent, or Firm* — Birch, Stewart, Kolasch & Birch, LLP

(57) ABSTRACT

A transmission radar (1) divides each of multiple frequency bands in such a manner that differences between center frequencies in respective frequency bands after the division are equal, and transmits, in time division manner, transmission signals of which transmission frequencies are the center frequencies in respective frequency bands after the division; a rearrangement processing unit (13) rearranges each of the reception video signals converted by the reception radar (5) in such a manner that sets of reception video signals corresponding to the multiple frequency bands before being divided by the transmission radar (1) are arranged in a row; and a band synthesis processing unit (14) performs a band synthesis on each of the reception video signals rearranged by the rearrangement processing unit (13).

12 Claims, 15 Drawing Sheets

(56) References Cited

OTHER PUBLICATIONS

Yinsheng et al., "A Novel 2-D Signal Processing Scheme for Quasi-Random Step Frequency Signal," Journal of Systems Engineering and Electronics, vol. 14, No. 3, 2003, pp. 77-80.
Takayuki Inaba "Multiple Target Detection for Stepped Multiple Frequency Interrupted CW Radar", The transactions of the Institute of Electronics, Information and Communication Engineers, B, vol. J89-B, No. 3, pp. 373-383.

* cited by examiner $\Delta f_1$ to $\Delta f_{N-1}$ Are Not Always Equal Due To Presence Of Unavailable Bands Bands Are Divided In Such Manner That Identical Center Frequency Differences $\Delta f$ Are Obtained

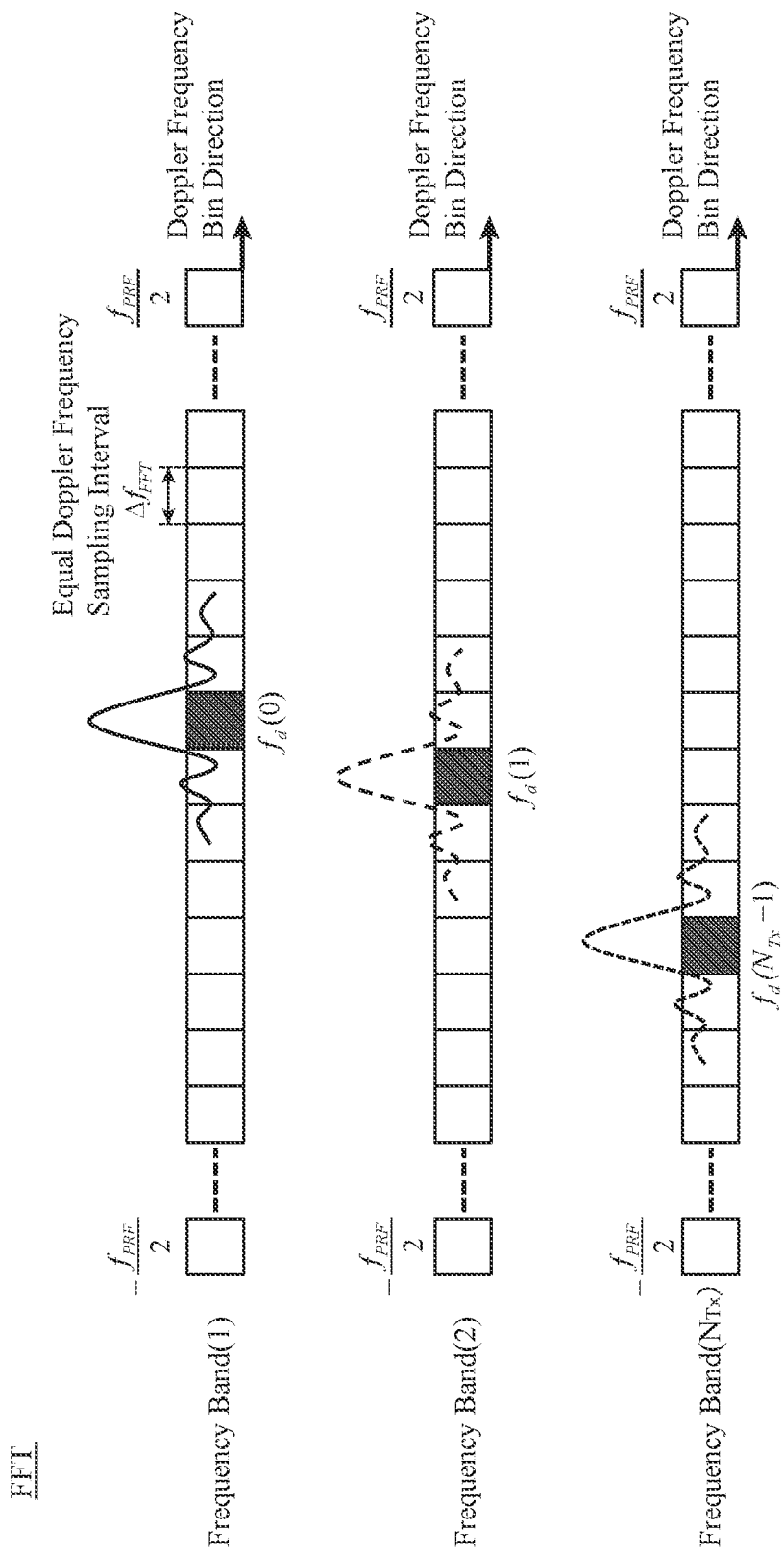

RADAR DEVICE

TECHNICAL FIELD

The present invention relates to a radar device that measures a range to a target.

BACKGROUND ART

A radar device including a transmission radar that transmits transmission signals while changing transmission frequencies of the transmission signals at predetermined intervals, and a reception radar that receives reflection signals that are transmission signals transmitted from the transmission radar and then reflected from a target is disclosed in Non-Patent Literature 1 listed below.

In the radar device, the transmission frequencies are changed so that the intervals of the transmission frequencies in a plurality of transmission signals become equal.

The radar device receives, for each range gate, each of reception signals corresponding to the transmission signals having different transmission frequencies.

Then the radar device measures a range to the target by performing a band synthesis on a plurality of reception signals in the same range gate.

CITATION LIST

Non-Patent Literatures

Non-Patent Literature 1: Takayuki Inaba, "Multiple Target Detection for Stepped Multiple Frequency Interrupted CW Radar", The transactions of the Institute of Electronics, Information and Communication Engineers. B, Vol. J89-B No. 3 pp. 373-383

SUMMARY OF INVENTION

Technical Problem

A conventional radar device changes transmission frequencies in such a manner that intervals of the transmission frequencies are equal in a plurality of transmission signals. Consequently, even when a band synthesis is performed on a plurality of reception signals in the same range gate, occurrence of unnecessary peaks at ranges other than the range to the target can be suppressed, and therefore the range to the target can be measured with high accuracy.

However, when unavailable frequency bands are interspersed, it may not be possible to set the intervals of transmission frequencies in the plurality of transmission signals at equal intervals. In such a case, when the transmission frequency intervals of the plurality of transmission signals are set to be unequal intervals, occurrence of many unnecessary peaks at ranges other than the range to the target is caused by performing a band synthesis on the plurality of reception signals in the same range gate, and thereby it becomes impossible to measure a range to the target, which is a problem.

The present invention has been made to solve the above-described problem, and it is an object of the present invention to obtain a radar device capable of measuring a range to a target even when unavailable frequency bands are interspersed.

Solution to Problem

The radar device according to the present invention includes a transmission radar for dividing each of multiple frequency bands in such a manner that differences between center frequencies in respective frequency bands after the division are equal, and transmitting, in time division manner, transmission signals of which transmission frequencies are the center frequencies in respective frequency bands after the division; a reception radar for receiving each of reflection signals that are the transmission signals transmitted in time division manner from the transmission radar and then reflected from a target, and converting each of the reflection signals into a reception video signal; a rearrangement processing unit for rearranging each of the reception video signals converted by the reception radar in such a manner that sets of reception video signals corresponding to the multiple frequency bands before being divided by the transmission radar are arranged in a row; and a band synthesis processing unit for performing a band synthesis on each of the reception video signals rearranged by the rearrangement processing unit, and wherein, a target detecting unit detects a range to the target from the reception video signals subjected to the band synthesis by the band synthesis processing unit.

Advantageous Effects of Invention

According to the present invention, a configuration is employed in which a transmission radar divides each of multiple frequency bands in such a manner that differences between center frequencies in respective frequency bands after the division are equal, and transmits, in time division manner, transmission signals of which transmission frequencies are the center frequencies in respective frequency bands after the division; a rearrangement processing unit rearranges each of the reception video signals converted by the reception radar in such a manner that sets of reception video signals corresponding to the multiple frequency bands before being divided by the transmission radar are arranged in a row; and a band synthesis processing unit performs a band synthesis on each of the reception video signals rearranged by the rearrangement processing unit, and therefore, it is possible to achieve an effect of enabling measuring a range to a target even when unavailable frequency bands are interspersed.

BRIEF DESCRIPTION OF DRAWINGS

FIG. 5 is a hardware configuration diagram of a computer when the signal processor 8 is implemented by software, firmware, or the like.

FIG. 12 is an explanatory diagram illustrating a result of fast Fourier transform when a center frequency difference $\Delta f$ is large or when a target velocity is high.

DESCRIPTION OF EMBODIMENTS

Hereinafter, in order to describe the present invention in more detail, an embodiment of the present invention will be described with reference to the attached drawings.

FIRST EMBODIMENT

Figure 1:
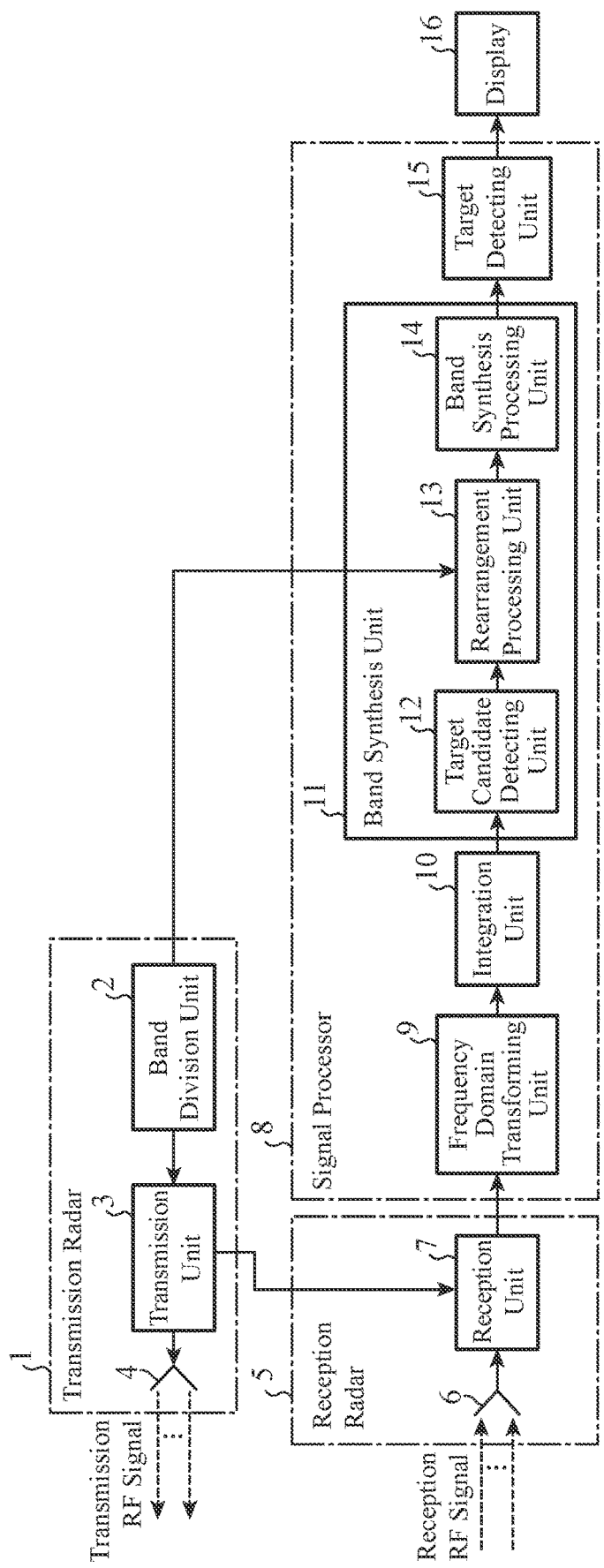
FIG. 1 is a configuration diagram illustrating a radar device according to a first embodiment of the present invention.
Figure 2:
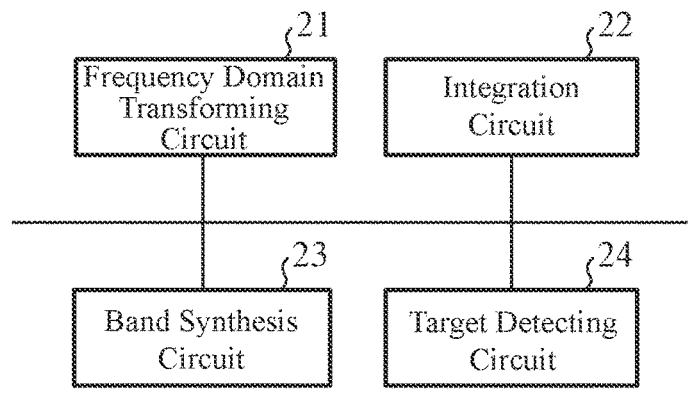
FIG. 2 is a hardware configuration diagram illustrating a signal processor 8 of the radar device according to the first embodiment of the present invention.

FIG. 1 is a configuration diagram illustrating a radar device according to a first embodiment of the present invention, and FIG. 2 is a hardware configuration diagram illustrating a signal processor 8 of the radar device according to the first embodiment of the present invention.

In FIG. 1, a transmission radar 1 includes a band division unit 2, a transmission unit 3, and an antenna 4.

The transmission radar 1 divides each of multiple frequency bands in such a manner that differences between center frequencies in respective frequency bands after the division are equal, and transmits, in time division manner, transmission signals of which transmission frequencies are the center frequencies in respective frequency bands after the division.

The band division unit 2 of the transmission radar 1 divides each of the multiple frequency bands in such a manner that the differences between the center frequencies in respective frequency bands after the division are equal, and outputs the center frequencies in respective frequency bands after the division to the transmission unit 3.

In addition, the band division unit 2 outputs, to a rearrangement processing unit 13 of a band synthesis unit 11, division information indicating how each of the multiple frequency bands has been divided.

The transmission unit 3 of the transmission radar 1 sets each of the center frequencies output from the band division unit 2 as a transmission frequency of a transmission pulse, and outputs a plurality of transmission pulses having different transmission frequencies as transmission RF signals (transmission signals) to the antenna 4 in time division manner.

The antenna 4 of the transmission radar 1 is an antenna that emits each of the transmission RF signals output from the transmission unit 3 into the air.

The reception radar 5 includes an antenna 6 and a reception unit 7.

The reception radar 5 receives each of reflection RF signals (reflection signals) that are the transmission RF signals transmitted in time division manner from the transmission radar 1 and then reflected from the target, and converts each of the reflection RF signals into a reception video signal.

The antenna 6 of the reception radar 5 receives the reflection RF signals that are the transmission RF signals emitted from the antenna 4 of the transmission radar 1 and then reflected back from the target, and outputs the received reflection RF signals as reception RF signals to the reception unit 7.

Although FIG. 1 illustrates an example in which the antenna 4 of the transmission radar 1 and the antenna 6 of the reception radar 5 are separately provided, the transmission radar 1 and the reception radar 5 may include one antenna in common. In that case, for example, it is satisfactory as long as the emission of the transmission RF signals from the antenna and the reception of the reflection RF signals in the antenna may be switched in time division manner by using a duplexer.

The reception unit 7 of the reception radar 5 converts each of the reception RF signals output from the antenna 6 into a reception video signal, and outputs each of the reception video signals to the signal processor 8.

The signal processor 8 includes a frequency domain transforming unit 9, an integration unit 10, the band synthesis unit 11, and a target detecting unit 15.

The signal processor 8 performs a rearrangement process for rearranging each of the reception video signals converted by the reception radar 5 in such a manner that sets of reception video signals corresponding to the multiple frequency bands before being divided by the transmission radar 1 are arranged in a row.

In addition, the signal processor 8 performs a band synthesis process for band-synthesizing each of the reception video signals after the rearrangement process.

Furthermore, the signal processor 8 performs a process for measuring a range to the target from the reception video signals after the band synthesis, and the like.

The frequency domain transforming unit 9 of the signal processor 8 is implemented, for example, by a frequency domain transforming circuit 21 illustrated in FIG. 2.

The frequency domain transforming unit 9 performs a process for transforming each of the reception video signals into a frequency domain signal that is a signal in a frequency domain based on a velocity and a range by performing fast Fourier transform on each of the reception video signals output from the reception radar 5.

Alternatively, the frequency domain transforming unit 9 performs a process for transforming each of the reception video signals into a frequency domain signal by performing discrete Fourier transform or chirp z-transform on each of the reception video signals output from the reception radar in such a manner that Doppler frequencies of the target belong to the same velocity bin even when transmission frequencies of transmission RF signals transmitted in time division manner from the transmission radar 1 are different.

The integration unit 10 of the signal processor 8 is implemented, for example, by an integration circuit 22 illustrated in FIG. 2.

The integration unit 10 performs a process for integrating each of the frequency domain signals transformed by the frequency domain transforming unit 9, and outputting each of the frequency domain signals after the integration to the band synthesis unit 11.

The band synthesis unit 11 of the signal processor 8 is implemented, for example, by a band synthesis circuit 23 illustrated in FIG. 2 and includes a target candidate detecting unit 12, the rearrangement processing unit 13, and a band synthesis processing unit 14.

The band synthesis unit 11 performs a process for rearranging each of the frequency domain signals after the integration output from the integration unit 10, while referring to the division information output from the band division unit 2 of the transmission radar 1, in such a manner that sets of frequency domain signals corresponding to the multiple frequency bands before being divided by the band division unit 2 are arranged in a row.

In addition, the band synthesis unit 11 performs a process for band-synthesizing each of the rearranged frequency domain signals.

The target candidate detecting unit 12 of the band synthesis unit 11 performs a process for detecting a candidate for the target from each of the frequency domain signals after the integration output from the integration unit 10.

The rearrangement processing unit 13 of the band synthesis unit 11 performs a process for selecting each ranging target bin that is a bin corresponding to the candidate for the target detected by the target candidate detecting unit 12 from each of the frequency domain signals after the integration output from the integration unit 10.

The rearrangement processing unit 13 performs a process for rearranging each of the selected ranging target bins, while referring to the division information output from the band division unit 2 of the transmission radar 1, in such a manner that sets of ranging target bins corresponding to the multiple frequency bands before being divided by the band division unit 2 are arranged in a row.

The band synthesis processing unit 14 of the band synthesis unit 11 performs a process for band-synthesizing each of the ranging target bins rearranged by the rearrangement processing unit 13.

The band synthesis processing unit 14 performs a process for specifying a target range at which a peak occurs in a result of the band synthesis, and outputting a sampling number corresponding to the target range and a velocity bin number of the target candidate detected by the target candidate detecting unit 12 to the target detecting unit 15.

The target detecting unit 15 is implemented, for example, by a target detecting circuit 24 illustrated in FIG. 2.

The target detecting unit 15 performs a process for detecting a range to the target by using the sampling number corresponding to the target range output from the band synthesis processing unit 14.

The target detecting unit 15 performs a process for calculating a relative velocity of the target by using the velocity bin number of the target candidate output from the band synthesis processing unit 14.

A display 16 displays a result of the range measuring of the target by the target detecting unit 15, and the like.

Figure 3:
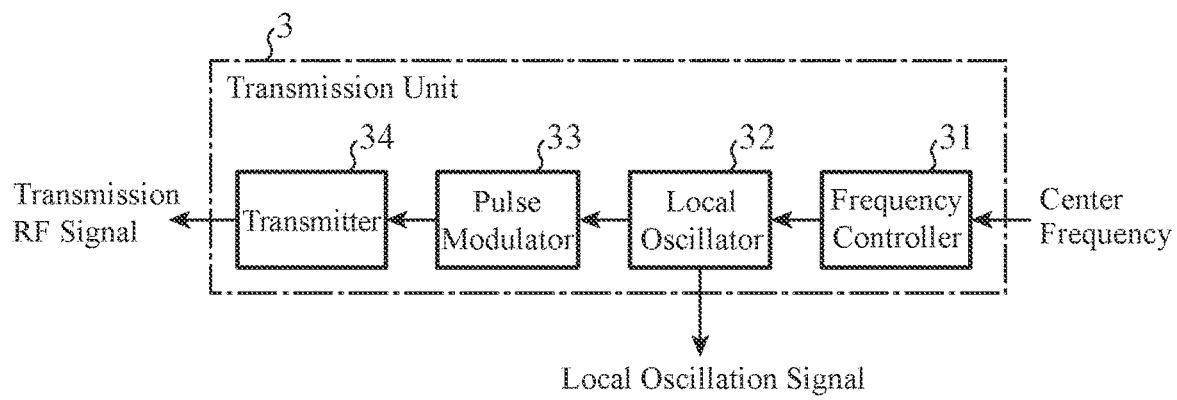
FIG. 3 is a configuration diagram illustrating a transmission unit 3 of the radar device according to the first embodiment of the present invention.

FIG. 3 is a configuration diagram illustrating the transmission unit 3 of the radar device according to the first embodiment of the present invention.

In FIG. 3, a frequency controller 31 sets each of the center frequencies output from the band division unit 2 in a local oscillator 32.

The local oscillator 32 generates local oscillation signals having respective center frequencies set by the frequency controller 31, and outputs each of the local oscillation signals to each of a pulse modulator 33 and a receiver 41 of the reception unit 7.

The pulse modulator 33 pulse-modulates each of the local oscillation signals output from the local oscillator 32 to generate a pulse signal, and outputs each of the pulse signals to the transmitter 34.

With the use of each of the pulse signals output from the pulse modulator 33, the transmitter 34 generates each of transmission RF signals that are shifted in time by a pulse repetition interval between each of the frequency bands set in advance, and outputs each of the transmission RF signals to the antenna 4.

Figure 4:
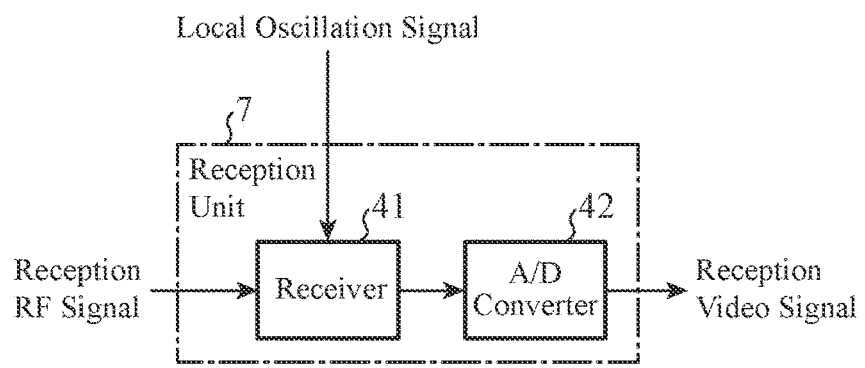
FIG. 4 is a configuration diagram illustrating a reception unit 7 of the radar device according to the first embodiment of the present invention.

FIG. 4 is a configuration diagram illustrating the reception unit 7 of the radar device according to the first embodiment of the present invention.

In FIG. 4, the receiver 41 down-converts a frequency of each of the reception RF signals output from the antenna 6 by using the local oscillation signal output from the local oscillator 32 of the transmission unit 3, and converts the reception RF signals of which the frequencies have been down-converted into reception video signals.

An A/D converter 42, which is an analog-to-digital converter, converts the reception video signals converted by the receiver 41 from analog signals to digital signals, and outputs the digital reception video signals to the frequency domain transforming unit 9 of the signal processor 8.

In FIG. 1, the frequency domain transforming unit 9, the integration unit 10, the band synthesis unit 11, and the target detecting unit 15, which are components of the signal processor 8, are assumed to be implemented by dedicated hardware as illustrated in FIG. 2, that is, the frequency domain transforming circuit 21, the integration circuit 22, the band synthesis circuit 23, and the target detecting circuit 24, respectively.

Here, the frequency domain transforming circuit 21, the integration circuit 22, the band synthesis circuit 23, and the target detecting circuit 24 correspond to, for example, a single circuit, a composite circuit, a programmed processor, a parallel programmed processor, an application specific integrated circuit (ASIC), a field-programmable gate array (FPGA), or a combination thereof.

The components of the signal processor 8 are not limited to those implemented by dedicated hardware, and the signal processor 8 may be implemented by software, firmware, or a combination of software and firmware.

Software or firmware is stored as a program in a memory of a computer. The computer means hardware for executing a program, and corresponds to, for example, a central processing unit (CPU), a central processing device, a processing device, an arithmetic device, a microprocessor, a microcomputer, a processor, or a digital signal processor (DSP).

Figure 5:
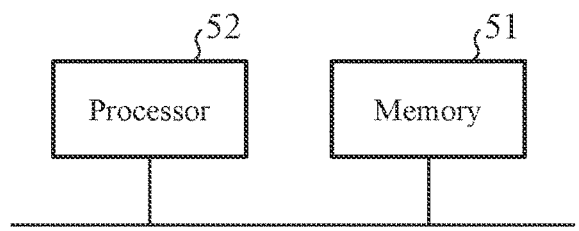

FIG. 5 is a hardware configuration diagram of a computer when the signal processor 8 is implemented by software, firmware, or the like.

When the signal processor 8 is implemented by software, firmware, or the like, it is satisfactory as long as programs for causing a computer to execute processing procedures of the frequency domain transforming unit 9, the integration unit 10, the band synthesis unit 11, and the target detecting unit 15 are stored in a memory 51, and a processor 52 of the computer executes the programs stored in the memory 51.

In addition, although FIG. 2 illustrates an example in which each of the components of the signal processor 8 is implemented by dedicated hardware, and FIG. 5 illustrates an example in which the signal processor 8 is implemented by software, firmware, or the like, some components of the signal processor 8 may be implemented by dedicated hardware, and the remaining components may be implemented by software, firmware, or the like.

Next, an operation will be described.

The band division unit 2 of the transmission radar 1 divides each of N (N is an integer of equal to or more than 1) available frequency bands (n) (n=1, . . . , N) in such a manner that a center frequency difference $\Delta f$, which is a difference between a center frequency in a frequency band (n−1) and a center frequency in a frequency band (n−2) after the division, is equal among the N frequency bands (n).

FIG. 6 is an explanatory diagram illustrating a frequency band division process by the band division unit 2.

Figure 6A:
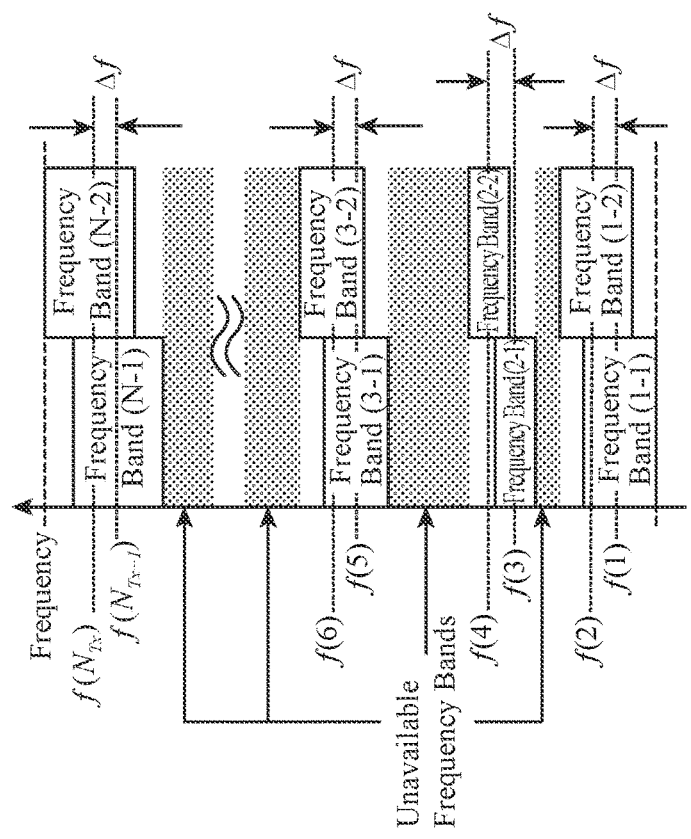
FIG. 6A is an explanatory diagram illustrating an example of frequency bands before being divided by a band division unit 2.
Figure 6B:
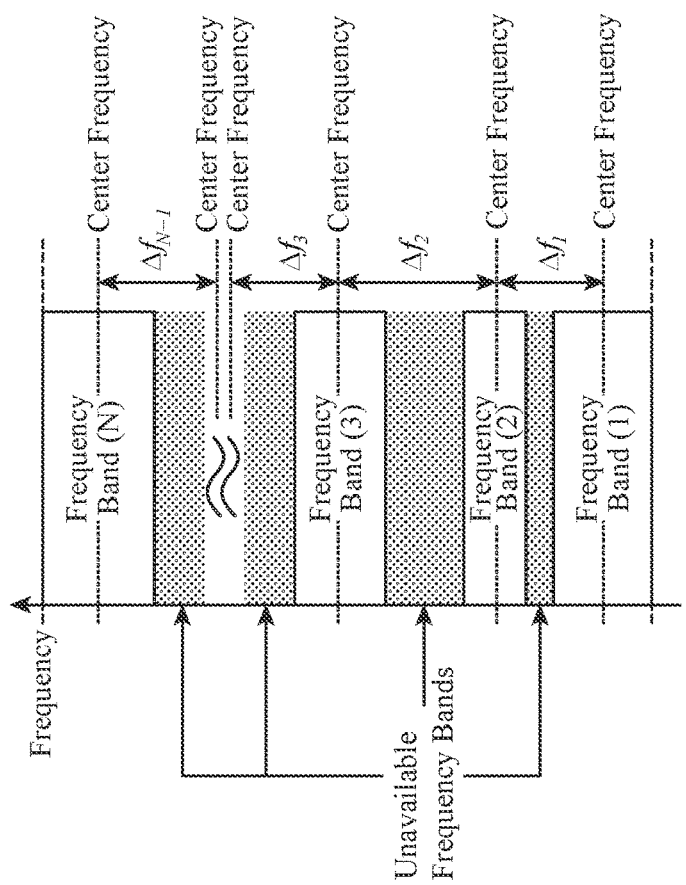
FIG. 6B is an explanatory diagram illustrating an example of frequency bands after being divided by the band division unit 2.

FIG. 6A illustrates an example of frequency bands before being divided by the band division unit 2, and FIG. 6B illustrates an example of frequency bands after being divided by the band division unit 2.

When a center frequency difference between a center frequency of frequency band (1) and a center frequency of frequency band (2) is denoted by $\Delta f_1$, a center frequency difference between the center frequency of frequency band (2) and a center frequency of frequency band (3) is denoted by $\Delta f_2$, . . . , and a center frequency difference between a center frequency of frequency band (N−1) and a center frequency of frequency band (N) is denoted by $\Delta f_{N-1}$, $\Delta f_1$ to $\Delta f_{N-1}$ are not always equal when unavailable frequency bands are interspersed.

In the example of FIG. 6A, since the unavailable frequency bands are interspersed, the intervals of the center frequencies in the N frequency bands (n) are unequal.

Now, FIG. 7 is an explanatory diagram illustrating a band synthesis result in a case where a band synthesis has been performed on reception video signals corresponding to multiple transmission signals having different transmission frequencies. The transmission frequency in each of the transmission signals corresponds to the center frequency of the frequency band (n).

Figure 7A:
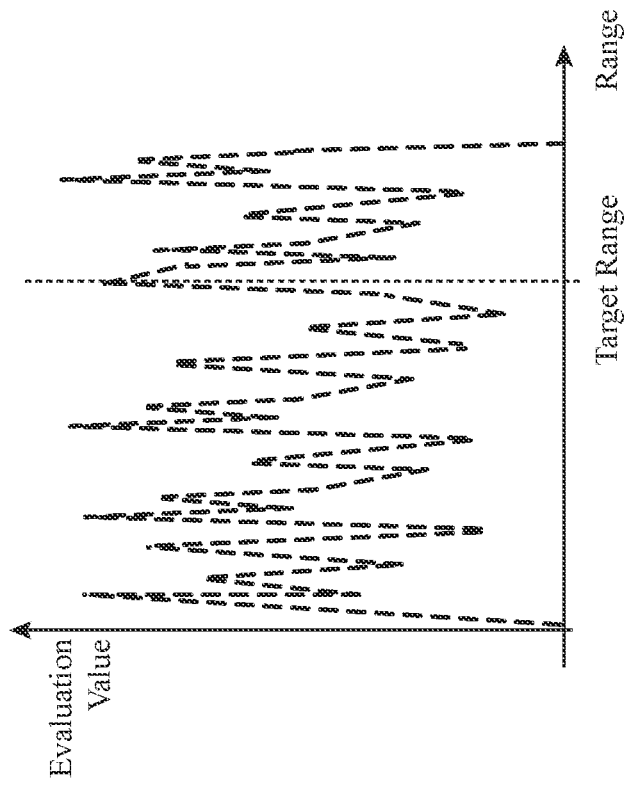
FIG. 7A is an explanatory diagram illustrating a band synthesis result in a case where intervals of center frequencies in N frequency bands (n) are equal.
Figure 7B:
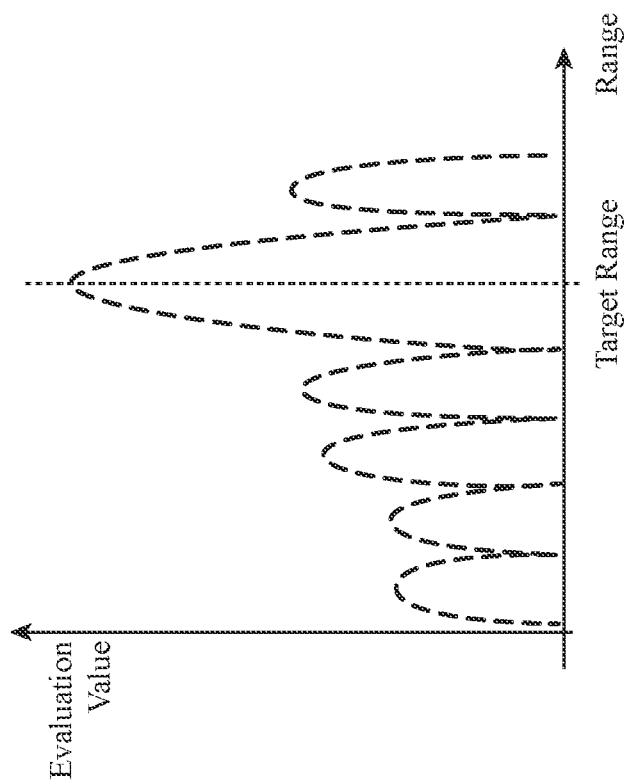
FIG. 7B is an explanatory diagram illustrating a band synthesis result in a case where intervals of center frequencies in N frequency bands (n) are unequal.

FIG. 7A illustrates a band synthesis result in a case where the intervals of the center frequencies in N frequency bands (n) are equal, and FIG. 7B illustrates a band synthesis result in a case where the intervals of the center frequencies in N frequency bands (n) are unequal.

In the case where the intervals of the center frequencies in N frequency bands (n) are equal, when a band synthesis is performed on reception video signals corresponding to multiple transmission signals, a peak at a range to the target (hereinafter referred to as target range) occurs as illustrated in FIG. 7A, and occurrence of unnecessary peaks at ranges other than the target range can be suppressed. Therefore, it is possible to find a range to the target from the band synthesis result.

In the case where the intervals of the center frequencies in N frequency bands (n) are unequal, when a band synthesis is performed on reception video signals corresponding to multiple transmission signals, many unnecessary peaks at ranges other than the target range occur as illustrated in FIG. 7B. Therefore, it is difficult to measure a range to the target from the band synthesis result.

In the first embodiment, in order to make it possible to measure a range to the target even when unavailable frequency bands are interspersed, the band division unit 2 divides each of N frequency bands (n) in such a manner that a center frequency difference $\Delta f$ between a center frequency in a frequency band (n−1) and a center frequency in a frequency band (n−2) after the division is equal among the N frequency bands (n), as illustrated in FIG. 6B.

In FIG. 6B, $n_{Tx}$ ($n_{Tx}$=1, . . . , $N_{Tx}$) denotes a band division number, $f(n_{Tx})$ denotes a center frequency in a frequency band after the division indicated by the band division number $n_{Tx}$, and $N_{Tx}$ denotes the number of frequency bands after the division.

FIG. 6B illustrates an example in which the number K of divisions of N frequency bands (n) is 2, but when each of the central frequency differences between the frequency bands after the division is $\Delta f$ and equal among the N frequency bands (n), the number K of divisions may be equal to or more than 3.

In the example of FIG. 6B, although the division has been performed in such a manner that the frequency band (n−1) and the frequency band (n−2) after the division partially overlap, the division may be performed in such a manner that the frequency band (n−1) and the frequency band (n−2) after the division do not partially overlap.

The bandwidths of the frequency bands (n−1) and (n−2) after the division can be set to any values, and all of the bandwidths of the frequency bands (n−1) and (n−2) after the division may be set to be the same, or all of the bandwidths of the frequency bands (n−1) and (n−2) after the division may be set to be different.

For example, FIG. 6B illustrates the example in which the bandwidths of the frequency bands (1-1) and (1-2) obtained by dividing the frequency band (1) are different from the bandwidths of the frequency bands (2-1) and (2-2) obtained by dividing the frequency band (2).

In order to set all of the bandwidths of the frequency bands (n−1) and (n−2) after the division to be the same, some of the available frequency bands may not be used.

When the band division unit 2 performs the division in such a manner that all of the bandwidths of the frequency bands (n−1) and (n−2) after the division are set to be equal, range resolutions in the frequency bands (n−1) and (n−2) after the division can be made equal.

By dividing the N frequency bands (n) by the band division unit 2, available frequency bands before the division can be treated as a continuous band.

In addition, the band division unit 2 performs the division in such a manner that the center frequency difference $\Delta f$ between the center frequency in the frequency band (n–1) and the center frequency in the frequency band (n–2) after the division is equal among the N frequency bands (n). Consequently, a phase difference $\varphi$ between a reception signal of the reception radar 5 corresponding to the center frequency in the frequency band (n–1) and a reception signal of the reception radar 5 corresponding to the center frequency in the frequency band (n–2), is expressed as the following formula (1).

Therefore, for example, the phase difference $\varphi$ related to the frequency bands (n–1) and (n–2) obtained by dividing the frequency band (1), and the phase difference $\varphi$ related to the frequency bands (N–1) and (N–2) obtained by dividing the frequency band (N) are the same. Consequently, each of the available frequency bands can be treated as a snapshot.

$$\Phi = \left[1, \exp\left(-j2\pi\frac{2r}{c}\Delta f\right), \cdots \exp\left(-j2\pi\frac{2r}{c}K\Delta f\right)\right] \quad (1)$$

In formula (1), r denotes a range from the radar device to the target, and c denotes a speed of light.

The band division unit 2 outputs a center frequency $f(n_{Tx})$ in each of the frequency bands after the division to the transmission unit 3.

In addition, the band division unit 2 outputs, to the rearrangement processing unit 13 of the band synthesis unit 11, division information indicating how each of the N frequency bands (n) has been divided.

The transmission unit 3 of the transmission radar 1 sets each center frequency $f(n_{Tx})$ output from the band division unit 2 as a transmission frequency of a transmission pulse, and outputs, to the antenna 4, multiple transmission pulses having different transmission frequencies as transmission RF signals.

Figure 8:
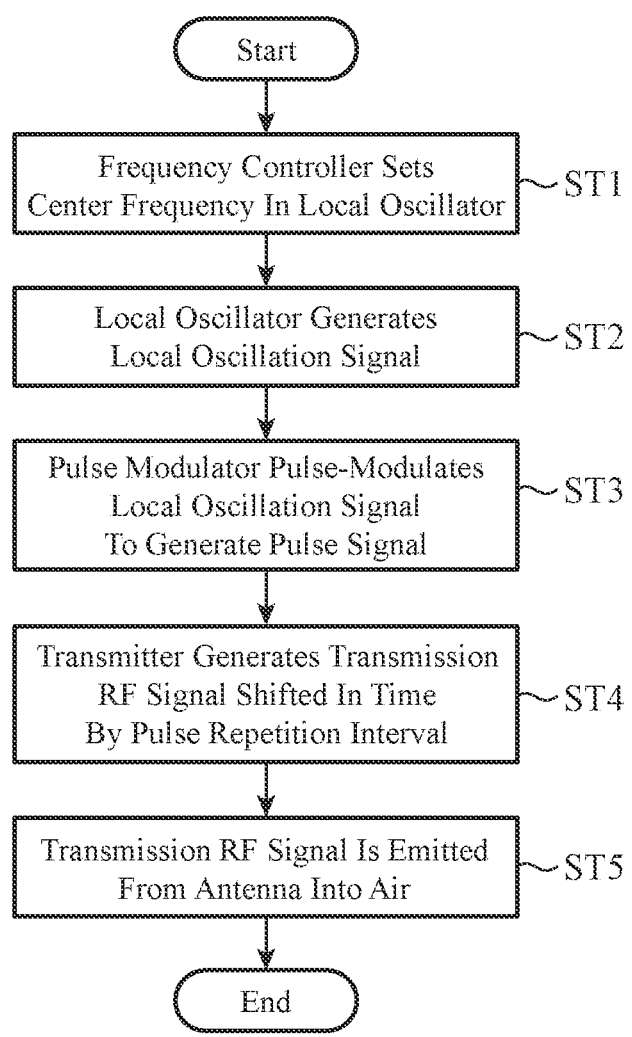
FIG. 8 is a flowchart illustrating processing of the transmission unit 3 of a transmission radar 1.

FIG. 8 is a flowchart illustrating processing of the transmission unit 3 of the transmission radar 1.

Hereinafter, the processing of the transmission unit 3 will be specifically described with reference to FIG. 8.

The frequency controller 31 of the transmission unit 3 sets each center frequency $f(n_{Tx})$ output from the band division unit 2 in the local oscillator 32 (Step ST1 in FIG. 8).

The local oscillator 32 generates local oscillation signals $L_0(n_{Tx}, t)$ having respective center frequencies $f(n_{Tx})$ set by the frequency controller 31, as indicated by the following formula (2), and outputs each local oscillation signal $L_0(n_{Tx}, t)$ to the pulse modulator 33 (Step ST2 in FIG. 8).

$$L_0(n_{Tx}, t) = A_L \exp(j[2\pi f(n_{Tx})t + \phi_0]) \quad (2)$$

$$(0 \le t < T_{obs})$$

In formula (2), $A_L$ denotes an amplitude of a local oscillation signal, $\varphi_0$ denotes an initial phase of the local oscillation signal, and $T_{obs}$ denotes observation time.

On the basis of pulse repetition intervals $T_s$ and pulse widths $T_0$ of all frequency bands set in advance, the pulse modulator 33 pulse-modulates each local oscillation signal $L_0(n_{Tx}, t)$ output from the local oscillator 32 as indicated by the following formula (3) to generate a pulse signal $L_{pls}(n_{Tx}, h, t)$ (Step ST3 in FIG. 8).

The pulse modulator 33 outputs the generated pulse signal $L_{pls}(n_{Tx}, h, t)$ to the transmitter 34.

$$L_{pls}(n_{Tx}, h, t) = \begin{cases} A_L \exp(j[2\pi f(n_{Tx})t + \phi_0]), & hT_s \le t < hT_s + T_0 \\ 0, & \text{otherwise} \end{cases} \quad (3)$$

$$(h = 0, 1, \cdots, H-1)$$

$$(n_{Tx} = 1, 2, \cdots, N_{Tx})$$

In formula (3), h denotes a hit number, H denotes the hit count, and they are expressed by the following formula (4).

$$H = \text{floor}\left(\frac{T_{obs}}{T_s}\right) \quad (4)$$

In formula (4), floor(X) denotes a function that returns an integer obtained by rounding down numbers below the decimal point of a variable X.

Now, FIG. 9 is an explanatory diagram illustrating transmission/reception timing of the radar.

Figures 9A, 9B:
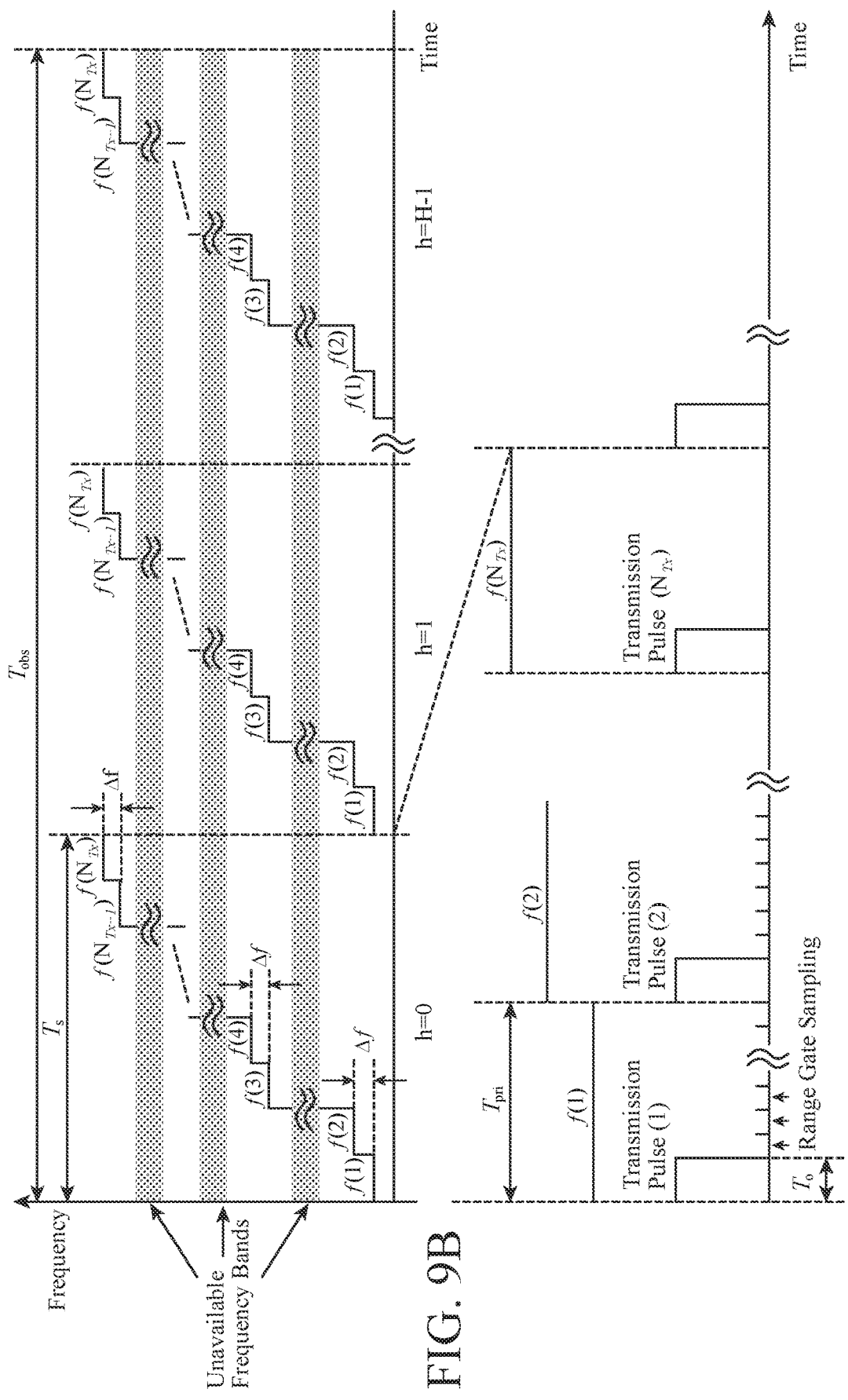
FIG. 9A is an explanatory diagram illustrating transition of center frequencies $f(n_{Tx})$ of frequency bands at each hit number h.
FIG. 9B is an explanatory diagram illustrating a relationship between the center frequencies $f(n_{Tx})$ and transmission pulses $(n_{Tx})$ in one hit number.

FIG. 9A illustrates transition of the center frequencies $f(n_{Tx})$ of the frequency bands in each hit number h.

In each hit number h, the center frequencies $f(n_{Tx})$ are changed stepwise, in a shape of unequally spaced steps, while avoiding unavailable frequency bands, and transmission pulses $(n_{Tx})$ having the center frequencies $f(n_{Tx})$ are transmitted in time division manner.

FIG. 9B illustrates a relationship between the center frequencies $f(n_{Tx})$ and the transmission pulses $(n_{Tx})$ in one hit number, and the transmission pulses $(n_{Tx})$ are each transmitted with a pulse width $T_0$ while changing the center frequency $f(n_{Tx})$ for each pulse repetition interval $T_{pri}$ between the respective frequency bands.

In FIG. 9B, a reflected pulse is received which is a transmission pulse $(n_{Tx})$ reflected from the target in each range gate sampling in a period of time from when the transmission pulse $(n_{Tx})$ is transmitted up to when the next transmission pulse $(n_{Tx})$ is transmitted.

As indicated by the following formula (5), the transmitter 34 uses the pulse signal $L_{pls}(n_{Tx}, h, t)$ output from the pulse modulator 33 to generate a transmission RF signal $Tx(n_{Tx}, h, t)$ shifted in time by the pulse repetition interval $T_{pri}$ (Step ST4 in FIG. 8).

The transmitter 34 outputs the generated transmission RF signal $Tx(n_{Tx}, h, t)$ to the antenna 4.

$$Tx(n_{Tx}, h, t) = L_{pls}(h, t - (n_{Tx} - 1)T_{pri}) \quad (5)$$

$$= \begin{cases} A_L \exp(j\{2\pi f(n_{Tx})[t - (n_{Tx} - 1)T_{pri}] + \phi_0\}), \\ \quad hT_s \le t < hT_s + T_0 \\ 0, \text{otherwise} \end{cases}$$

$$(h = 0, 1, \cdots, H-1)$$

$$(n_{Tx} = 1, 2, \cdots, N_{Tx})$$

As a result, the transmission RF signal $Tx(n_{Tx}, h, t)$ is emitted from the antenna 4 into the air (Step ST5 in FIG. 8).

In the first embodiment, although an example is indicated in which one transmitter 34 transmits, in time division manner, transmission RF signals $Tx(n_{Tx}, h, t)$ of which center frequencies $f(n_{Tx})$ as transmission frequencies are different, $N_{Tx}$ transmitters 34 may transmit, at the same timing, transmission RF signals $Tx(n_{Tx}, h, t)$ of which center frequencies $f(n_{Tx})$ are different.

The reception radar 5 receives the reflection RF signals that are transmission RF signals Tx($n_{Tx}$, h, t) transmitted in time division manner from the transmission radar 1 and then reflected from the target, and converts the received reflection RF signals into reception video signals V($n_{Tx}$, h, t).

Figure 10:
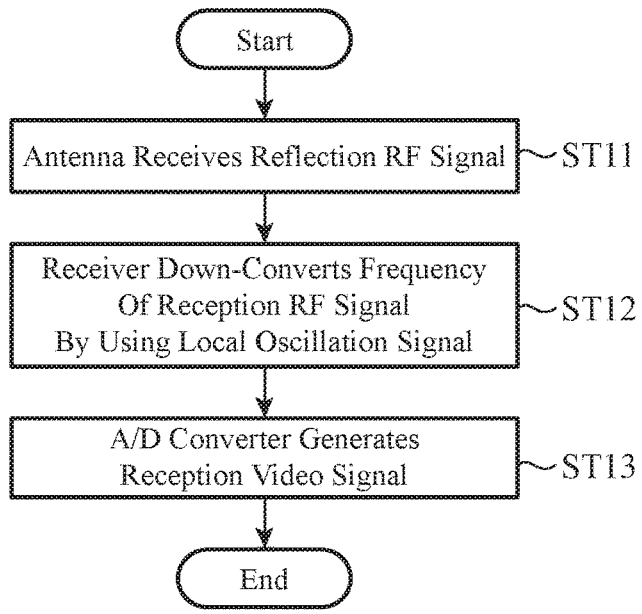
FIG. 10 is a flowchart illustrating processing of a reception radar 5.

FIG. 10 is a flowchart illustrating processing of the reception radar 5.

Hereinafter, the processing of the reception radar 5 will be specifically described with reference to FIG. 10.

The transmission RF signal Tx($n_{Tx}$, h, t) emitted from the antenna 4 of the transmission radar 1 to the air is reflected from the target. The transmission RF signal Tx($n_{Tx}$, h, t) reflected back from the target is incident on the antenna 6 as a reflection RF signal.

The antenna 6 of the reception radar 5 receives the incident reflection RF signal, and outputs the received reflection RF signal as a reception RF signal Rx($n_{Tx}$, h, t) expressed by the following formula (6) to the reception unit 7 (Step ST11 in FIG. 10).

$$Rx(n_{Tx}, h, t) = \begin{cases} A_R \exp\left\{j\left[2\pi f(n_{Tx})\left(t' - \frac{2(R_0 - vt)}{c}\right)\right] + \phi_0\right\} \\ \exp\left[-j2\pi f(n_{Tx})\left(\frac{2v(n_{Tx} - 1)T_{pri}}{c}\right)\right], \\ hT_s \le t < hT_s + T_0 \\ 0, \text{otherwise} \end{cases} \quad (6)$$

$(h = 0, 1, \cdots, H - 1)$ $(n_{Tx} = 1, 2, \cdots, N_{Tx})$ $(0 \le t' < T_{pri})$ In formula (6), $A_R$ denotes an amplitude of the reflection RF signal, $R_0$ denotes an initial target relative range, v denotes a target relative velocity, and t' denotes time within one hit.

The receiver 41 of the reception unit 7 down-converts a frequency of each reception RF signal Rx($n_{Tx}$, h, t) output from the antenna 6 by using the local oscillation signal $L_0(n_{Tx}, t)$ having the center frequency $f(n_{Tx})$ corresponding to the band division number $n_{Tx}$ output from the local oscillator 32 expressed by the above formula (2) (Step ST12 in FIG. 10).

The receiver 41 generates a reception video signal V'($n_{Tx}$, h, t) expressed by the following formula (7) by passing the reception RF signal Rx($n_{Tx}$, h, t) of which frequency has been down-converted to a band-pass filter, and then performing an amplification process and phase detection on the reception RF signal Rx($n_{Tx}$, h, t).

The receiver 41 outputs the generated reception video signal V'($n_{Tx}$, h, t) to the A/D converter 42.

$$V'(n_{Tx}, h, t) = Rx(n_{Tx}, h, t)L_0^*(n_{Tx}, t) \quad (7)$$

$$= \begin{cases} A_{V'} \exp\left[-j2\pi f(n_{Tx})\left(\frac{2(R_0 - vt)}{c}\right)\right] \\ \exp\left[-j2\pi f(n_{Tx})\left(\frac{2(n_{Tx} - 1)vT_{pri}}{c}\right)\right], \\ hT_s \le t < hT_s + T_0 \\ 0, \text{otherwise} \end{cases}$$

$(h = 0, 1, \cdots, H - 1)$ $(n_{Tx} = 1, 2, \cdots, N_{Tx})$

In formula (7), $A_{V'}$ denotes an amplitude of the reception video signal, and a superscript * denotes a complex conjugate.

The A/D converter 42 of the reception unit 7 generates a digital reception video signal V($n_{Tx}$, h, m) expressed by the following formula (8) by converting the reception video signal V'($n_{Tx}$, h, t) output from the receiver 41 from an analog signal to a digital signal (Step ST13 in FIG. 10).

The A/D converter 42 outputs the generated reception video signal V($n_{Tx}$, h, m) to the frequency domain transforming unit 9 of the signal processor 8.

$$V(n_{Tx}, h, m) = \quad (8)$$

$$= \begin{cases} A \exp\left\{-j2\pi f(n_{Tx})\frac{2[R_0 - v(hT_{pri} + m\Delta t)]}{c}\right\} \\ \exp\left[-j2\pi f(n_{Tx})\left(\frac{2(n_{Tx} - 1)vT_{pri}}{c}\right)\right], \\ hT_s \le t < hT_s + T_0 \\ 0, \text{otherwise} \end{cases}$$

$(m = 0, 1, \cdots, M - 1)$ $(h = 0, 1, \cdots, H - 1)$ $(n_{Tx} = 1, 2, \cdots, N_{Tx})$ In formula (8), m denotes a sampling number in PRI, and M denotes the sample count in PRI.

Figure 11:
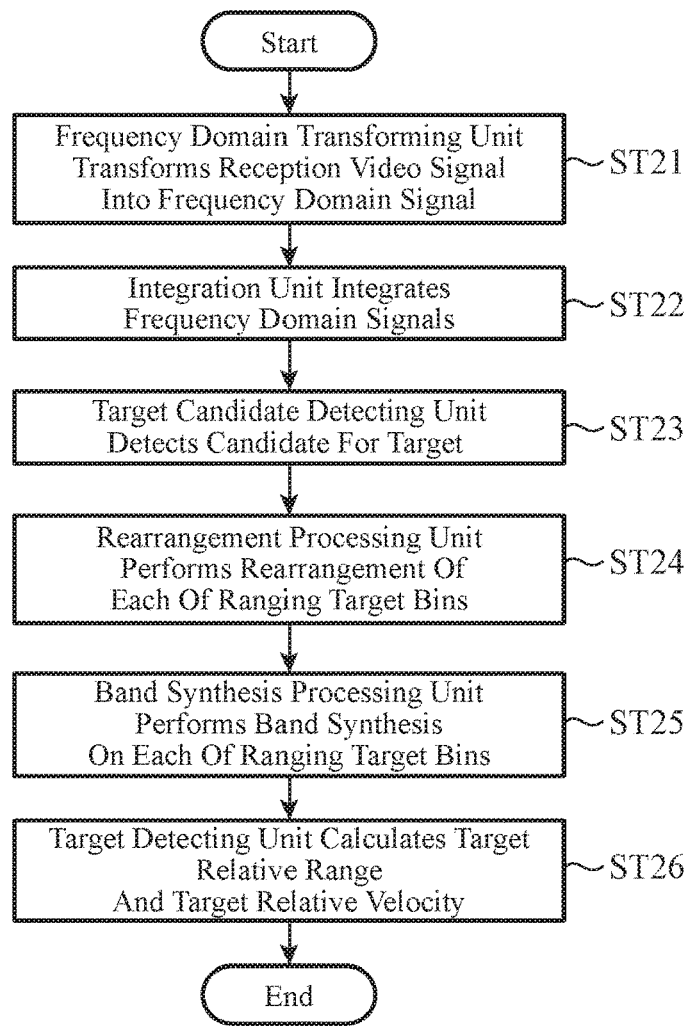
FIG. 11 is a flowchart illustrating processing of the signal processor 8.

FIG. 11 is a flowchart illustrating processing of the signal processor 8.

Hereinafter, the processing of the signal processor 8 will be described with reference to FIG. 11.

Each of the reception video signals V($n_{Tx}$, h, m) output from the A/D converter 42 of the reception unit 7 is input to the frequency domain transforming unit 9 of the signal processor 8.

Because the center frequency $f(n_{Tx})$ as a transmission frequency is different for every reception video signals V($n_{Tx}$, h, m) output from the A/D converter 42, even reception video signals relating to reflection RF signals reflected from the same target become signals having different Doppler frequencies $f_d(n_{Tx})$, as indicated by the following formula (9), when the relative velocity to the target is v.

$$f_d(n_{Tx}) = f(n_{Tx})\frac{2v}{c} \quad (9)$$

$(n_{Tx} = 1, 2, \cdots, N_{Tx})$

A Doppler frequency is obtained by transforming the reception video signal V($n_{Tx}$, h, m) into a signal in a frequency domain in a hit direction.

By performing fast Fourier transform (FFT) on the reception video signals V($n_{Tx}$, h, m) having different center frequencies $f(n_{Tx})$ as transmission frequencies, the reception video signals V($n_{Tx}$, h, m) are transformed into signals in the frequency domain. At that time, when the center frequency difference Δf between the frequency bands after the division by the band division unit 2 is large or when a target velocity is high, sampling is performed at equal Doppler frequency intervals $\Delta f_{FFT}$ as illustrated in FIG. 12. Therefore, the Doppler frequency bins are different for each center frequency $f(n_{Tx})$.

FIG. 12 is an explanatory diagram illustrating a result of fast Fourier transform when the center frequency difference $\Delta f$ is large or when the target velocity is high.

Figure 13A:
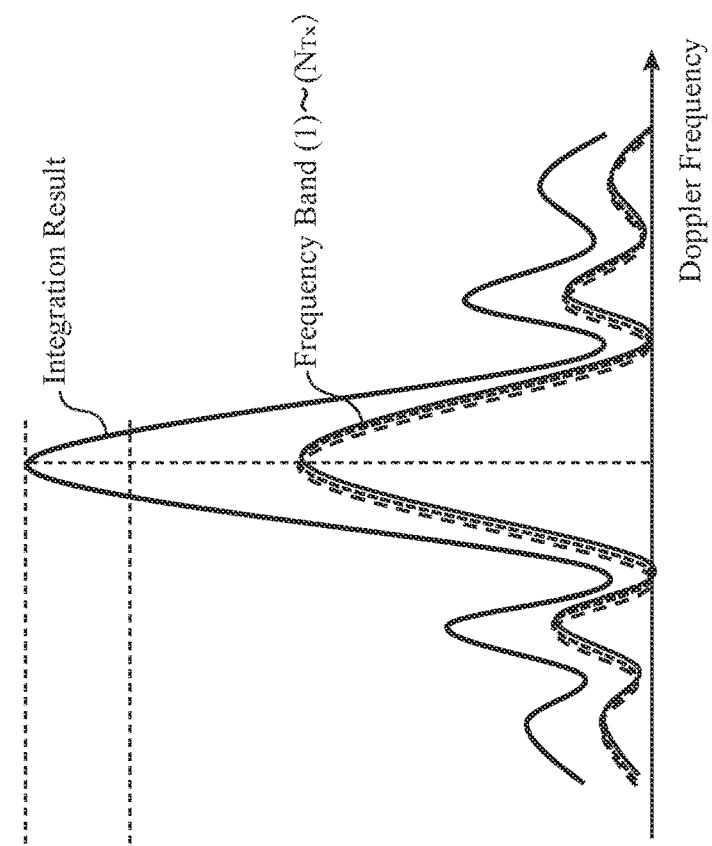
FIG. 13A is an explanatory diagram illustrating an integration result of signals in a frequency domain when the center frequency difference $\Delta f$ is large or when the target velocity is high.

When signals in the frequency domain are integrated in a state where the Doppler frequency bins are different for each center frequency $f(n_{Tx})$, as illustrated in FIG. 13A, the signals are not integrated at the same Doppler frequency. Consequently, an integral loss occurs, which makes it difficult to perform a target candidate detecting process and a band synthesis process.

When the center frequency difference $\Delta f$ is small or when the target velocity is low, the Doppler frequency bins become approximately the same bin by performing the fast Fourier transform on the reception video signals $V(n_{Tx}, h, m)$ having different center frequencies $f(n_{Tx})$ even after transforming the reception video signals $V(n_{Tx}, h, m)$ into signals in the frequency domain.

Figure 13B:
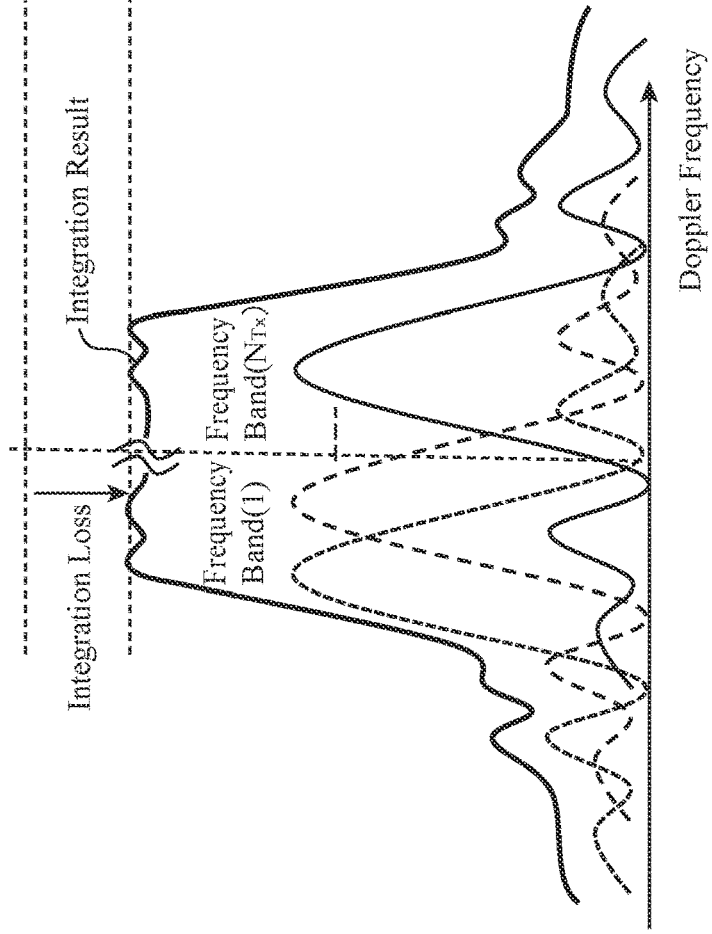
FIG. 13B is an explanatory diagram illustrating an integration result of signals in the frequency domain when the center frequency difference $\Delta f$ is small or when the target velocity is low.

Consequently, when the signals in the frequency domain are integrated, as illustrated in FIG. 13B, the signals are integrated at the same Doppler frequency. Consequently, the integration loss is reduced, and the target candidate detecting process and the band synthesis process become possible.

FIG. 13 is an explanatory diagram illustrating integration results of the signals in the frequency domain.

FIG. 13A illustrates an integration result of signals in the frequency domain when the center frequency difference $\Delta f$ is large or when the target velocity is high, and FIG. 13B illustrates an integration result of signals in the frequency domain when the center frequency difference $\Delta f$ is small or when the target velocity is low.

Therefore, when it is known that the Doppler frequency bins become the same bin even when the center frequencies $f(n_{Tx})$ are different, such as when the center frequency difference $\Delta f$ is small or when the target velocity is low, the reception video signals $V(n_{Tx}, h, m)$ may be transformed into signals in the frequency domain by performing the fast Fourier transform on the reception video signals $V(n_{Tx}, h, m)$ having different center frequencies $f(n_{Tx})$.

In the first embodiment, an example will be described in which the frequency domain transforming unit 9 performs chirp z-transform (CZT) on the reception video signals $V(n_{Tx}, h, m)$ having different center frequencies $f(n_{Tx})$ as transmission frequencies in such a manner that the Doppler frequency bins become the same bin even when the center frequency difference $\Delta f$ is large or when the target velocity is high.

The chirp z-transform is a transform method for transforming the reception video signals $V(n_{Tx}, h, m)$ into signals in the frequency domain while changing a Doppler frequency interval for each of the different central frequencies $f(n_{Tx})$.

Figure 14:
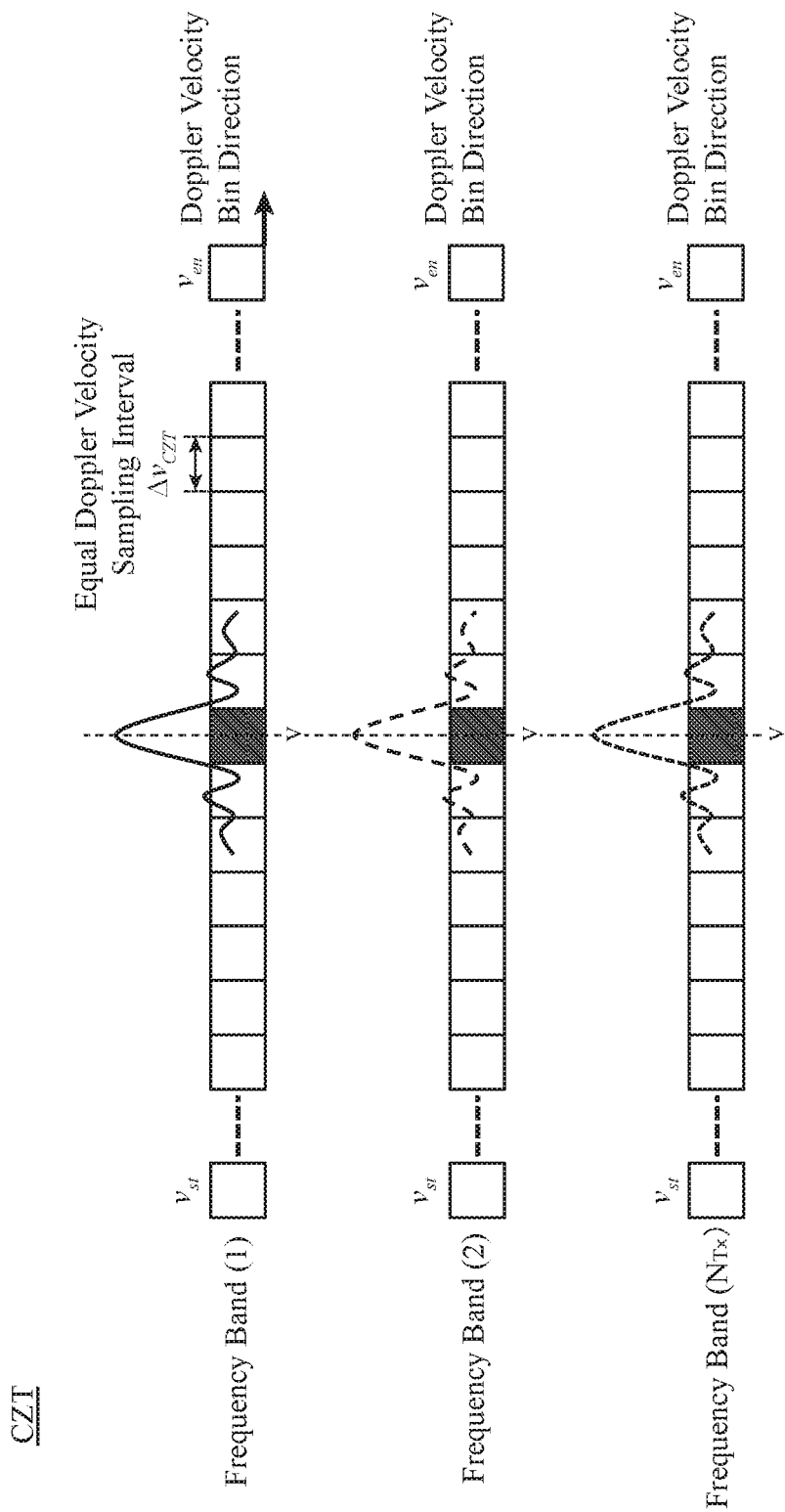
FIG. 14 is an explanatory diagram illustrating a result of chirp z-transform of reception video signals $V(n_{Tx}, h, t)$.

FIG. 14 is an explanatory diagram illustrating a result of the chirp z-transform of the reception video signals $V(n_{Tx}, h, m)$.

The reception video signals $V(n_{Tx}, h, m)$ are sampled by a pulse width in one hit, but in FIG. 14, only one sample is illustrated for simplification of the description.

In FIG. 14, $\Delta v_{CZT}$ denotes a sample interval of equal Doppler velocity in the frequency domain.

In the fast Fourier transform, since transform is performed at equal Doppler frequency intervals, the Doppler frequency bins are different when the center frequencies $f(n_{Tx})$ are different, but in the chirp z-transform, a transform function of chirp z-transform is changed for each center frequency $f(n_{Tx})$, and thereby equal Doppler velocity intervals are obtained. Consequently, even when the center frequencies $f(n_{Tx})$ are different, the Doppler velocity bins of the signals in the frequency domain after the transform become the same.

The frequency domain transforming unit 9 transforms the reception video signal $V(n_{Tx}, h, m)$ into a frequency domain signal $F_{CZT}(n_{Tx}, h_{czt}, m)$ based on a velocity and a range by performing the chirp z-transform on the reception video signal $V(n_{Tx}, h, m)$ output from the A/D converter 42 of the reception unit 7 as indicated by the following formula (10) (Step ST21 in FIG. 11).

The frequency domain transforming unit 9 outputs the frequency domain signal $F_{CZT}(n_{Tx}, h_{czt}, m)$ based on a velocity and a range to the integration unit 10.

$$F_{CZT}(n_{Tx}, h_{czt}, m) = \sum_{h=0}^{H-1} V(n_{Tx}, h, m) z_{n_{Tx}}^{-h} \quad (10)$$

$$= \sum_{h=0}^{H-1} V(n_{Tx}, h, m) \left( A_{n_{Tx}} W_{n_{Tx}}^{-h_{czt}} \right)^{-h}$$

$$(m = 0, 1, \cdots, M-1)$$

$$(h_{czt} = 0, 1, \cdots, H_{czt} - 1)$$

$$(n_{Tx} = 1, 2, \cdots, N_{Tx})$$

In formula (10), $z_{n_{Tx}}^{-h}$ denotes a transform function of the chirp z-transform corresponding to the center frequency $f(n_{Tx})$.

$A_{n_{Tx}}$ denotes a transform start phase corresponding to the center frequency $f(n_{Tx})$, and is expressed by the following formula (11).

$W_{n_{Tx}}^{-h_{czt}}$ denotes a transform range function of the chirp z-transform corresponding to the center frequency $f(n_{Tx})$, and is expressed by the following formula (12).

$$A_{n_{Tx}} = \exp\left( j2\pi f(n_{Tx}) \frac{2v_{st}}{cf_{samp}} \right) \quad (11)$$

$$(n_{Tx} = 1, 2, \cdots, N_{Tx})$$

$$W_{n_{Tx}}^{-h_{czt}} = \exp\left( -j2\pi f(n_{Tx}) \frac{2(v_{en} - v_{st})}{c} \frac{-h_{czt}}{H_{czt} f_{samp}} \right) \quad (12)$$

$$(h_{czt} = 0, 1, \cdots, H_{czt} - 1)$$

$$(n_{Tx} = 1, 2, \cdots, N_{Tx})$$

In formulas (11) and (12), $v_{st}$ denotes a transform start velocity, yen denotes a transform end velocity, and $H_{CZT}$ denotes the sample count after the chirp z-transform.

$f_{samp}$ denotes a sampling frequency and is expressed by the following formula (13).

The relative velocity $v_{CZT}(h_{czt})$ of the velocity bin number $h_{czt}$ after being transformed into the frequency domain is expressed by the following formula (14).

$$f_{samp} = \frac{1}{\Delta t} \quad (13)$$

$$v_{czt}(h_{czt}) = v_{st} + h_{czt} \Delta v_{czt} \quad (14)$$

By the transform process performed by the frequency domain transforming unit 9 in accordance with formulas (10) to (12), for any center frequency $f(n_{Tx})$, the frequency domain signal $F_{CZT}(n_{Tx}, h_{czt}, m)$ based on a velocity and a range is sampled in a frequency direction from the transform start velocity $v_{st}$ to the transform end velocity $v_{en}$ at the same Doppler velocity sampling intervals $\Delta v_{CZT}$, as illustrated in FIG. 14. As a result, the target is sampled into the same Doppler velocity bin.

Because the sample count $H_{CZT}$ after the chirp z-transform can be set arbitrarily, it is possible to set the Doppler velocity sampling interval $\Delta v_{CZT}$ arbitrarily. In addition, the transform start velocity $v_{st}$ and the transform end velocity yen can be set arbitrarily on the basis of the assumed relative velocity.

In the first embodiment, an example is indicated in which the frequency domain transforming unit 9 performs the chirp z-transform on the reception video signal $V(n_{Tx}, h, m)$, but no limitation thereto is intended.

For example, as indicated by the following formula (15), the frequency domain transforming unit 9 may implement the chirp z-transform by convolutional integration in the frequency domain using the fast Fourier transform (FFT) and inverse FFT (IFFT). In that case, a process can be performed at high speed, as compared to discrete Fourier Transform (DFT).

$$F_{CZT}(n_{Tx}, h_{czt}, m) = \qquad (15)$$

$$= W_n^{\frac{h_{czt}^2}{2}} \left[ \left( V(n_{Tx}, h, m) A_{n_{Tx}}^{-h} W_{n_{Tx}}^{\frac{h^2}{2}} \right) * W_{n_{Tx}}^{-\frac{h^2}{2}} \right]$$

$$= W_{n_{Tx}}^{\frac{h_{czt}^2}{2}} IFFT\left[ FFT\left( V(n_{Tx}, h, m) A_{n_{Tx}}^{-h} W_{n_{Tx}}^{\frac{h^2}{2}} \right) FFT\left( W_{n_{Tx}}^{-\frac{h^2}{2}} \right) \right]$$

$$(m = 0, 1, \cdots, M - 1)$$

$$(h_{czt} = 0, 1, \cdots, H_{czt} - 1)$$

$$(n_{Tx} = 1, 2, \cdots, N_{Tx})$$

In formula (15), * is a symbol representing convolution.

Figure 15:
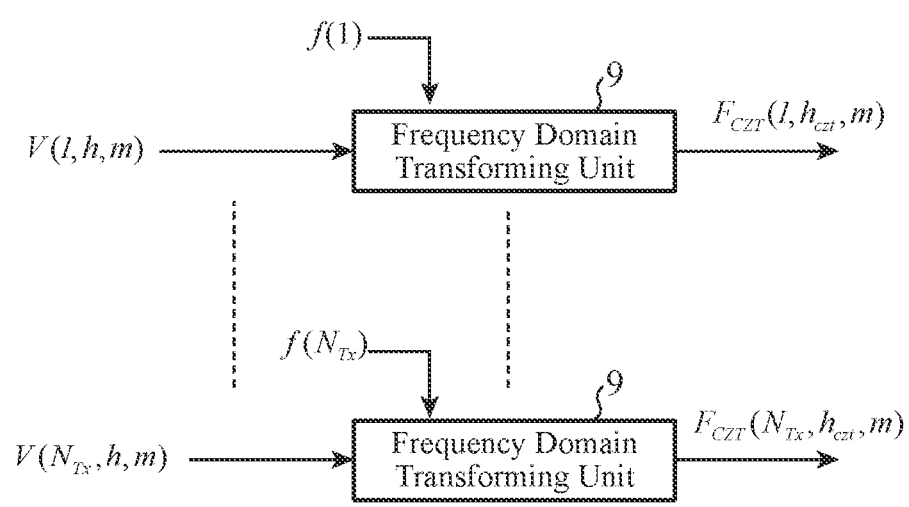
FIG. 15 is an explanatory diagram illustrating an input/output relationship in a transform process of a frequency domain transforming unit 9.

FIG. 15 is an explanatory diagram illustrating an input/output relationship in a transform process of the frequency domain transforming unit 9.

FIG. 15 illustrates that the reception video signal $V(n_{Tx}, h, m)$ output from the A/D converter 42 of the reception unit 7 is subjected to the chirp z-transform at the center frequency $f(n_{Tx})$ corresponding to the band division number $n_{Tx}$, and the frequency domain signal $F_{CZT}(n_{Tx}, h_{czt}, m)$ based on a velocity and a range is output.

Figure 16:
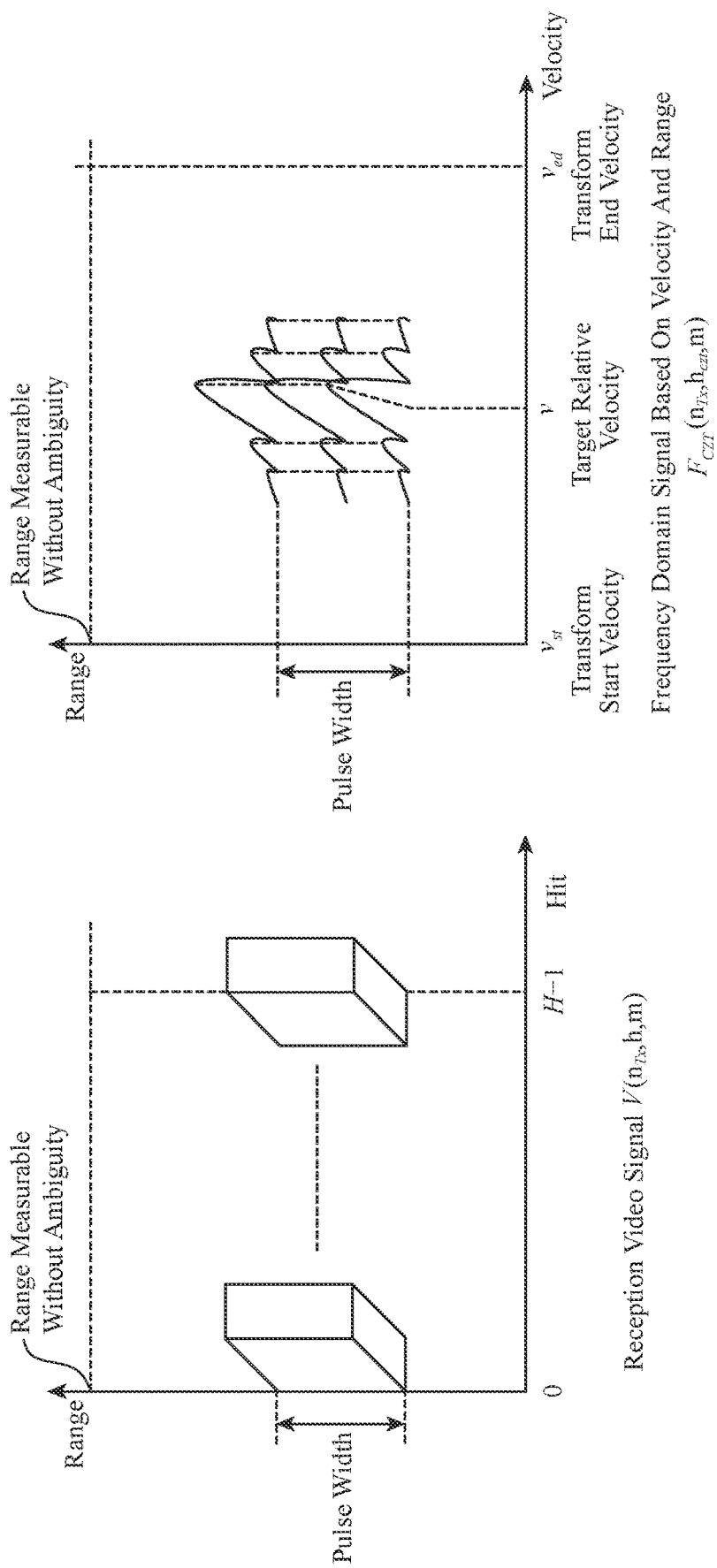
FIG. 16 is an explanatory diagram illustrating a spectrum of a reception video signal $V(n_{Tx}, h, m)$ and a spectrum of a frequency domain signal $F_{CZT}(n_{Tx}, h_{czt}, m)$.

FIG. 16 is an explanatory diagram illustrating a spectrum of the reception video signal $V(n_{Tx}, h, m)$ and a spectrum of the frequency domain signal $F_{CZT}(h_{Tx}, h_{czt}, m)$.

In FIG. 16, the reception video signal from the target appears as the reception video signal $V(n_{Tx}, h, m)$ over each hit h, but, regarding the frequency domain signal $F_{CZT}(n_{Tx}, h_{czt}, m)$, the peak of the spectrum appears in a target relative velocity bin as a result of the transform process performed on the reception video signal $V(n_{Tx}, h, m)$.

When there is a concern that the frequency domain signal $F_{CZT}(n_{Tx}, h_{czt}, m)$ based on a velocity and a range may be buried in a sidelobe such as a clutter, the frequency domain transforming unit 9 performs a window function process as indicated by the following formula (16) to generate a reception video signal $V_w(n_{Tx}, h, m)$ after the window function process.

Then, the frequency domain transforming unit 9 generates the frequency domain signal $F_{CZT}(n_{Tx}, h_{czt}, m)$ based on a velocity and a range by substituting, instead of the reception video signal $V(n_{Tx}, h, m)$, the reception video signal $V_w(n_{Tx}, h, m)$ after the window function process into formula (10) or formula (15).

By performing the window function process, a sidelobe in a velocity direction in each signal in the frequency domain after the transform can be reduced, and the target can be prevented from being buried in the sidelobe.

$$V_w(n_{Tx}, h, m) = V(n_{Tx}, h, m) w_{ham}(h)$$

$$(m = 0, 1, \ldots, M-1)$$

$$(h = 0, 1, \ldots, H-1)$$

$$(n_{Tx} = 1, 2, \ldots, N_{Tx}) \qquad (16)$$

In formula (16), $w_{ham}(h)$ denotes a humming window expressed by the following formula (17). Although the window function process is performed by using the humming window $w_{ham}(h)$ here, window functions other than the humming window may be used as long as a sidelobe in the velocity direction in each signal in the frequency domain after the transform can be reduced.

$$w_{ham}(h) = 0.54 + 0.46 \cos\left(\frac{2\pi h}{H-1}\right) \qquad (17)$$

$$(h = 0, 1, \cdots, H - 1)$$

The integration unit 10 of the signal processor 8 integrates the frequency domain signals $F_{CZT}(n_{Tx}, h_{czt}, m)$ based on a velocity and a range output from the frequency domain transforming unit 9, as indicated by the following formula (18), and outputs a frequency domain signal $F_{CZT,PDI}(h_{czt}, m)$ after the integration to the band synthesis unit 11 (Step ST22 in FIG. 11).

$$F_{CZT,PDI}(h_{czt}, m) = \sum_{n_{Tx}=0}^{N_{Tx}-1} |F_{CZT}(n_{Tx}, h_{czt}, m)|^2 \qquad (18)$$

$$(m = 0, 1, \cdots, M - 1)$$

$$(h_{czt} = 0, 1, \cdots, H_{czt} - 1)$$

Figure 17:
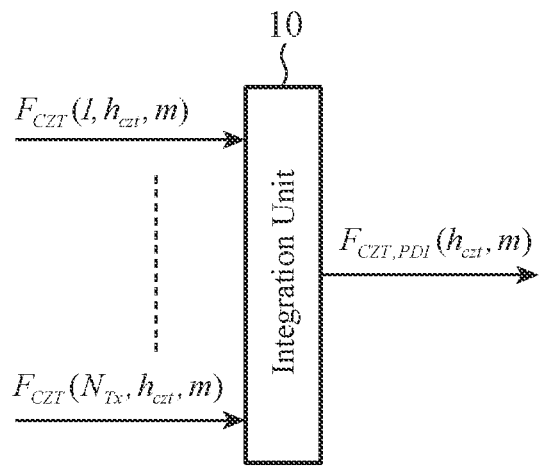
FIG. 17 is an explanatory diagram illustrating an input/output relationship in an integration process of an integration unit 10.

FIG. 17 is an explanatory diagram illustrating an input/output relationship in an integration process of the integration unit 10.

FIG. 17 illustrates that the frequency domain signals $F_{CZT}(1, h_{czt}, m)$ to $F_{CZT}(N_{Tx}, h_{czt}, m)$ output from the frequency domain transforming unit 9 are integrated, and the frequency domain signal $F_{CZT,PDI}(h_{czt}, m)$ after the integration is output.

In the integration process of the integration unit 10, the phases of spectra of multiple center frequencies $f(n_{Tx})$ are removed to obtain their power only, and then non-coherent addition is performed for each frequency.

As a result, even when received power of the reception RF signal $Rx(n_{Tx}, h, t)$ is so small that it is impossible to estimate the target velocity with high accuracy only from a pulse train with one center frequency $f(n_{Tx})$, velocity estimation accuracy is improved by the integration unit 10 performing the integration process.

In the first embodiment, an example is indicated in which the signal processor 8 includes the integration unit 10, but the integration unit 10 may be omitted in a case where when detecting a target Doppler frequency, the received power of the reception RF signal $Rx(n_{Tx}, h, t)$ is large enough, so that it is possible to estimate the target velocity accurately only from a pulse train with one center frequency $f(n_{Tx})$.

When the integration unit 10 is omitted, the frequency domain signal $F_{CZT}(n_{Tx}, h_{czt}, m)$ corresponding to the band division number $n_{Tx}$ is output to the band synthesis unit 11.

The band synthesis unit 11 of the signal processor 8 performs a process for rearranging each of the frequency domain signals $F_{CZT,PDI}(h_{czt}, m)$ after the integration output from the integration unit 10, while referring to the division information output from the band division unit 2 of the transmission radar 1, in such a manner that sets of frequency domain signals corresponding to the multiple frequency bands before being divided by the band division unit 2 are arranged in a row.

Hereinafter, processing of the band synthesis unit 11 will be specifically described.

The target candidate detecting unit 12 of the band synthesis unit 11 detects a candidate for the target on the basis of signal intensities of the frequency domain signals $F_{CZT,PDI}(h_{czt}, m)$ after the integration output from the integration unit 10 (Step ST23 in FIG. 11).

For example, a cell average constant false alarm rate (CA-CFAR) process is possible as a process of detecting a target candidate.

The target candidate detecting unit 12 outputs the velocity bin number $h'_{czt}$ of the detected target candidate and the sampling number m' in a range direction to the rearrangement processing unit 13.

Figure 18:
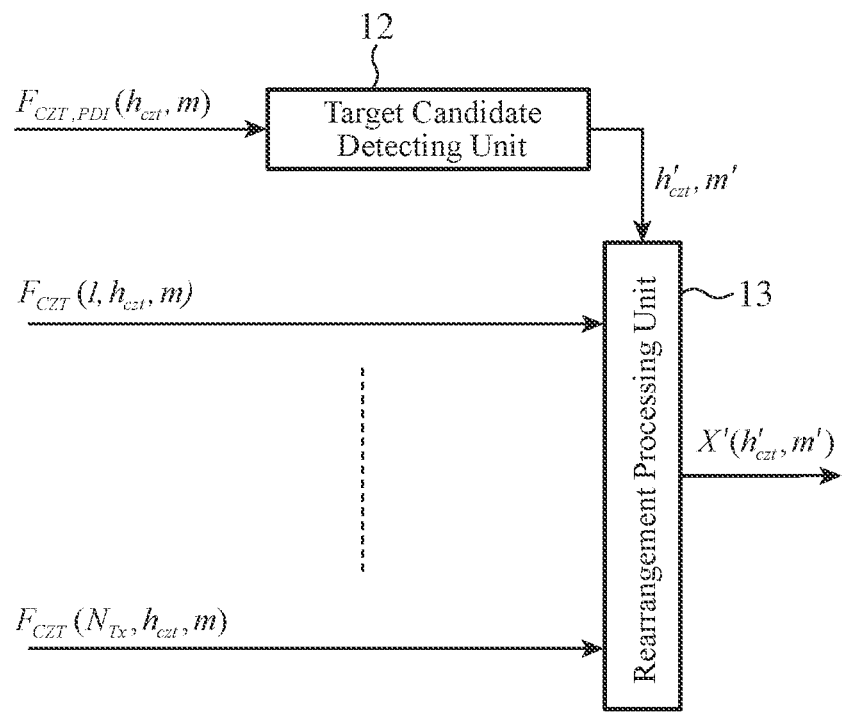
FIG. 18 is an explanatory diagram illustrating an input/output relationship in a target candidate detecting unit 12 and a rearrangement processing unit 13.

FIG. 18 is an explanatory diagram illustrating an input/output relationship in the target candidate detecting unit 12 and the rearrangement processing unit 13.

As indicated by the following formula (19), the rearrangement processing unit 13 of the band synthesis unit 11 selects, as a ranging target bin $X(h'_{czt}, m')$, a signal corresponding to the velocity bin number $h'_{czt}$ and the sampling number m' output from the target candidate detecting unit 12 from among the frequency domain signals $F_{CZT,PDI}(h_{czt}, m)$ after the integration output from the integration unit 10. The ranging target bin $X(h'_{czt}, m')$ is a bin corresponding to the candidate for the target detected by the target candidate detecting unit 12.

$$X(h'_{czt}, m') = \begin{bmatrix} F_{CZT}(1, h'_{czt}, m') \\ F_{CZT}(2, h'_{czt}, m') \\ F_{CZT}(3, h'_{czt}, m') \\ F_{CZT}(4, h'_{czt}, m') \\ \vdots \\ F_{CZT}(N_{Tx} - 1, h'_{czt}, m') \end{bmatrix} \in [N_{Tx} \times 1] \quad (19)$$

Figure 19:
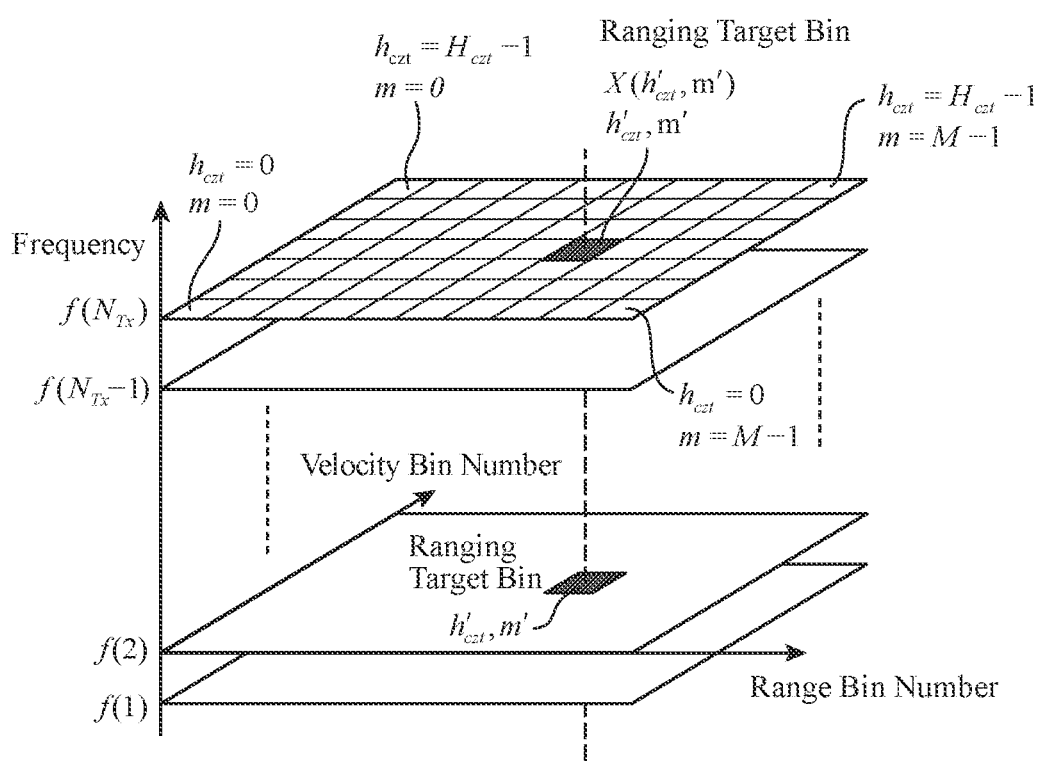
FIG. 19 is an explanatory diagram illustrating a frequency domain signal $F_{CZT,PDI}(h_{czt}, m)$ after integration and a ranging target bin $X(h'_{czt}, m')$.

Now, FIG. 19 is an explanatory diagram illustrating the frequency domain signals $F_{CZT,PDI}(h_{czt}, m)$ after the integration and the ranging target bin $X(h'_{czt}, m')$.

In FIG. 19, the ranging target bin $X(h'_{czt}, m')$ corresponding to the velocity bin number $h'_{czt}$ and the sampling number m' is a ranging target bin with hatching.

In the transmission radar 1, the transmission RF signals $Tx(n_{Tx}, h, t)$ corresponding to the frequency bands after the division are transmitted in time division manner, and therefore, transmission start time of each transmission RF signal $Tx(n_{Tx}, h, t)$ is different for each band division number $n_{Tx}$.

Consequently, when the target to be observed is a stationary target, no phase difference occurs between the center frequencies $f(n_{Tx})$ in the respective transmission RF signals $Tx(n_{Tx}, h, t)$, but when the target to be observed is a moving target, a phase difference occurs between the center frequencies $f(n_{Tx})$ in the respective transmission RF signals $Tx(n_{Tx}, h, t)$ due to the difference in the transmission start time.

Therefore, when the target to be observed is a moving target, there is a need to compensate for the phase of the ranging target bin $X(h'_{czt}, m')$ at a time of performing a band synthesis on the ranging target bin $X(h'_{czt}, m')$.

Because the center frequencies $f(n_{Tx})$ of the frequency bands after the division, the difference in transmission start time among the respective transmission RF signals $Tx(n_{Tx}, h, t)$, and the velocity bin number $h'_{czt}$ are known, the rearrangement processing unit 13 can compensate for the phase of the ranging target bin $X(h'_{czt}, m')$ by using the following formulas (20) and (21).

In formula (20), $X_{cor}(h'_{czt}, m')$ denotes a ranging target bin after the phase compensation, and in formula (21), $v_{cor}(n_{Tx})$ denotes a phase compensation amount.

$$X_{cor}(h'_{czt}, m') = \begin{bmatrix} F_{CZT}(1, h'_{czt}, m')V_{cor}(1) \\ F_{CZT}(2, h'_{czt}, m')V_{cor}(2) \\ F_{CZT}(3, h'_{czt}, m')V_{cor}(3) \\ F_{CZT}(4, h'_{czt}, m')V_{cor}(4) \\ \vdots \\ F_{CZT}(N_{Tx} - 1, h'_{czt}, m')V_{cor}(N_{Tx}) \end{bmatrix} = \begin{bmatrix} F_{CZT,cor}(1, h'_{czt}, m') \\ F_{CZT,cor}(2, h'_{czt}, m') \\ F_{CZT,cor}(3, h'_{czt}, m') \\ F_{CZT,cor}(4, h'_{czt}, m') \\ \vdots \\ F_{CZT,cor}(N_{Tx} - 1, h'_{czt}, m') \end{bmatrix} \quad (20)$$

$$V_{cor}(n_{Tx}) = \exp\left[j2\pi f(n_{Tx})\left(\frac{2(n_{Tx} - 1)T_{pri}}{c}\right)(v_{st} + h'_{czt}\Delta v_{czt})\right] \quad (21)$$

$$(n_{Tx} = 1, 2, \cdots, N_{Tx})$$

Here, the rearrangement processing unit 13 compensates for the phase of the ranging target bin $X(h'_{czt}, m')$, but, for example, when a configuration is employed in which multiple transmission radars transmit respective transmission RF signals $Tx(n_{Tx}, h, t)$ at the same time, the phase compensation process of the ranging target bin $X(h'_{czt}, m')$ can be omitted.

The rearrangement processing unit 13 performs a process for rearranging each of the ranging target bins $X_{cor}(h'_{czt}, m')$, while referring to the division information output from the band division unit 2 of the transmission radar 1, in such a manner that sets of ranging target bins corresponding to the multiple frequency bands (1) to (N) before being divided by the band division unit 2 are arranged in a row (Step ST24 in FIG. 11).

In the rearrangement process by the rearrangement processing unit 13, $N_{Tx}$ ranging target bins $X(h'_{czt}, m')$ are classified for each of the frequency bands (n) before the division. Then, K ranging target bins $X(h'_{czt}, m')$ belonging to the same frequency band (n) are rearranged in a matrix so as to be arranged in a row.

Figure 20:
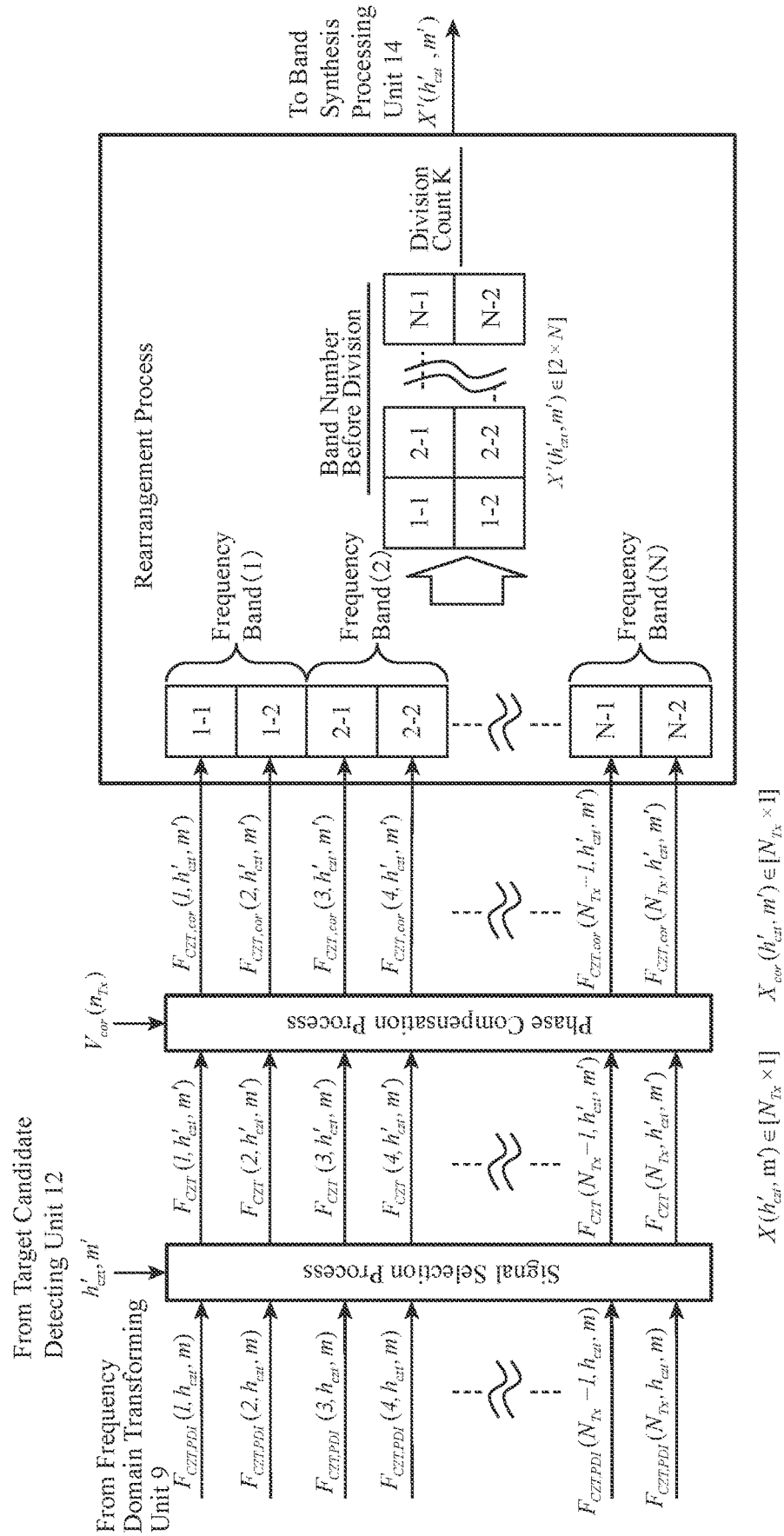
FIG. 20 is an explanatory diagram illustrating a signal selection process, a phase compensation process, and a rearrangement process by the rearrangement processing unit 13.

FIG. 20 is an explanatory diagram illustrating a signal selection process, a phase compensation process, and a rearrangement process by the rearrangement processing unit 13.

In FIG. 20, because the band division unit 2 of the transmission radar 1 divides each of the available frequency bands (1) to (N) into two, the rearrangement processing unit 13 performs rearrangement into a 2×N matrix.

That is, in the example of FIG. 20, the rearrangement processing unit 13 rearranges the ranging target bins $X(h'_{czt}, m')$ as indicated by the following formula (22), and outputs the ranging target bins $X'(h'_{czt}, m')$ after the rearrangement process to the band synthesis processing unit 14.

$$X'(h'_{czt}, m') = \begin{bmatrix} F_{CZT,cor}(1, h'_{czt}, m') & F_{CZT,cor}(3, h'_{czt}, m') & \cdots & F_{CZT,cor}(N_{Tx}-1, h'_{czt}, m') & \cdots \\ F_{CZT,cor}(2, h'_{czt}, m') & F_{CZT,cor}(4, h'_{czt}, m') & \cdots & F_{CZT,cor}(N_{Tx}, h'_{czt}, m') & \end{bmatrix} \in [2 \times N] \quad (22)$$

The band synthesis processing unit 14 of the band synthesis unit 11 performs a band synthesis on each of the ranging target bins $X'(h'_{czt}, m')$ rearranged by the rearrangement processing unit 13 (Step ST25 in FIG. 11).

As the band synthesis process, for example, a beamformer (BF) method can be used in which the respective ranging target bins $X'(h'_{czt}, m')$ thus rearranged are added uniformly over the entire range.

In the first embodiment, since all the central frequency differences Δf between the frequency bands are equal, as illustrated in FIG. 7A, unnecessary peaks do not occur in the band synthesis result, and a peak occurs at the target range.

The band synthesis processing unit 14 specifies a target range at which a peak occurs in the band synthesis result by performing a one-dimensional super-resolution process on the band synthesis result.

Then, the band synthesis processing unit 14 outputs the sampling number 1' corresponding to the specified target range and the velocity bin number $h'_{czt}$ of the target candidate detected by the target candidate detecting unit 12 to the target detecting unit 15.

Here, an example is indicated in which the band synthesis processing unit 14 uses the BF method as a band synthesis process, but a Capon method obtained by improving the BF method may be used.

Alternatively, as a band synthesis process using a one-dimensional super-resolution process in a range direction, a multiple signal classification (MUSIC) method or the like may be used.

The MUSIC method makes use of a fact that a noise subspace and a signal subspace are orthogonal on the basis of an eigenfunction expansion of a correlation function, and a band synthesis process of each ranging target bin $X'(h'_{czt}, m')$ and a process for specifying a target range at which a peak occurs can be performed together.

The target detecting unit 15 of the signal processor 8 calculates a target relative range $R'_{tgt}$ which is a range from the radar device to the target by using the sampling number 1' corresponding to the target range output from the band synthesis processing unit 14 as indicated by the following formula (23) (Step ST26 in FIG. 11).

$$R'_{tgt} = l' \Delta r_{sb} \quad (23)$$

In formula (23), $\Delta r_{sb}$ denotes a sampling interval in the range direction in the one-dimensional super-resolution process.

In addition, the target detecting unit 15 calculates a target relative velocity $v'_{tgt}$ which is a relative velocity of the target with respect to the radar device by using the velocity bin number $h'_{czt}$ of the target candidate output from the band synthesis processing unit 14 as indicated by the following formula (24) (Step ST26 in FIG. 11).

$$v'_{tgt} = v_{czt}(h'_{czt}) \quad (24)$$

The target detecting unit 15 outputs the calculated target relative range $R'_{tgt}$ and target relative velocity $v'_{tgt}$ to the display 16.

The display 16 displays the target relative range $R'_{tgt}$ and the target relative velocity $v'_{tgt}$ output from the target detecting unit 15 on the screen as a signal processing result of the signal processor 8.

As is apparent from the above, according to the first embodiment, a configuration is employed in which the transmission radar 1 divides each of multiple frequency bands in such a manner that differences between center frequencies in respective frequency bands after the division are equal, and transmits, in time division manner, transmission signals of which transmission frequencies are the center frequencies in respective frequency bands after the division; the rearrangement processing unit 13 rearranges each of the reception video signals converted by the reception radar 5 in such a manner that sets of reception video signals corresponding to the multiple frequency bands before being divided by the transmission radar 1 are arranged in a row; and the band synthesis processing unit 14 performs a band synthesis on each of the reception video signals rearranged by the rearrangement processing unit 13, and therefore, it becomes possible to achieve an effect of enabling measuring a range to a target even when unavailable frequency bands are interspersed.

In the first embodiment, in order to enable the rearrangement processing unit 13 to select the ranging target bin $X(h'_{czt}, m')$ from the frequency domain signals $F_{CZT,PDI}(n_{Tx}, h_{czt}, m)$ after the integration, the target candidate detecting unit 12 detects the velocity bin number $h'_{czt}$ of the target candidate.

When the rearrangement processing unit 13 does not need to detect the target, for example, when performing a band synthesis process not only on the ranging target bin $X(h'_{czt}, m')$ but on all bins, the target candidate detecting unit 12 may be omitted.

In the present invention, any constituent element of the embodiment can be modified, or any constituent element of the embodiment can be omitted, within the scope of the invention.

INDUSTRIAL APPLICABILITY

The present invention is suitable for a radar device that measures a range to a target.

REFERENCE SIGNS LIST

1: Transmission radar, 2: Band division unit, 3: Transmission unit, 4: Antenna, 5: Reception radar, 6: Antenna, 7: Reception unit, 8: Signal processor, 9: Frequency domain transforming unit, 10: Integration unit, 11: Band synthesis unit, 12: Target candidate detecting unit, 13: Rearrangement processing unit, 14: Band synthesis processing unit, 15: Target detecting unit, 16: Display, 21: Frequency domain transforming circuit, 22: Integration circuit, 23: Band synthesis circuit, 24: Target detecting circuit, 31: Frequency controller, 32: Local oscillator, 33: Pulse modulator, 34: Transmitter, 41: Receiver, 42: A/D converter, 51: Memory, 52: Processor.

The invention claimed is:

1. A radar device comprising:
a transmission radar which divides each of multiple frequency bands in such a manner that differences between center frequencies in respective frequency bands after division are equal, and transmits, in time division manner, transmission signals of which transmission frequencies are the center frequencies in respective frequency bands after division;
a reception radar which receives each of reflection signals that are transmission signals transmitted in time division manner from the transmission radar and then reflected from a target, and converts each of the reflection signals into a reception video signal;
a rearrangement processor which rearranges each of the reception video signals converted by the reception radar in such a manner that sets of the reception video signals corresponding to the multiple frequency bands before being divided by the transmission radar are arranged in a row;
a band synthesis processor which performs a band synthesis on each of the reception video signals rearranged by the rearrangement processor; and
a target detector which detects a range to the target from the reception video signals subjected to the band synthesis by the band synthesis processor.

2. The radar device according to claim 1, wherein the target detector detects a range to the target from the reception video signals subjected to the band synthesis by the band synthesis processor, and calculates a relative velocity of the target from the reception video signals subjected to the band synthesis by the band synthesis processor.

3. The radar device according to claim 1, wherein the transmission radar divides each of the multiple frequency bands in such a manner that the differences between the center frequencies in respective frequency bands after division are equal, and bandwidths of the respective frequency bands after division are equal.

4. The radar device according to claim 1, comprising:
a frequency domain transformer which transforms each of the reception video signals converted by the reception radar into a frequency domain signal that is a signal in a frequency domain based on a velocity and a range, wherein
the rearrangement processor rearranges each of the frequency domain signals transformed by the frequency domain transformer as each of the reception video signals converted by the reception radar.

5. The radar device according to claim 4, wherein the frequency domain transformer transforms each of the reception video signals into a frequency domain signal by performing fast Fourier transform on each of the reception video signals converted by the reception radar.

6. The radar device according to claim 4, wherein the frequency domain transformer transforms each of the reception video signals converted by the reception radar into a frequency domain signal in such a manner that Doppler frequencies of the target belong to a same velocity bin even when the transmission frequencies of the transmission signals transmitted in time division manner from the transmission radar are different.

7. The radar device according to claim 6, wherein the frequency domain transformer transforms each of the reception video signals into a frequency domain signal by performing discrete Fourier transform on each of the reception video signals converted by the reception radar.

8. The radar device according to claim 6, wherein the frequency domain transformer transforms each of the reception video signals into a frequency domain signal by performing chirp z-transform on each of the reception video signals converted by the reception radar.

9. The radar device according to claim 4, wherein the frequency domain transformer performs a window function process on each of the reception video signals converted by the reception radar, and transforms each of the reception video signals after the window function process into a frequency domain signal.

10. The radar device according to claim 1, comprising:
a target candidate detector which detects a candidate for the target from each of the reception video signals converted by the reception radar, wherein
the rearrangement processor selects, from each of the reception video signals converted by the reception radar, each ranging target bin that is a bin corresponding to the candidate for the target detected by the target candidate detector, and rearranges each of the selected ranging target bins as each of the reception video signals converted by the reception radar.

11. The radar device according to claim 10, comprising an integrator integrates each of the reception video signals converted by the reception radar, and outputs each of the reception video signals after integration to the target candidate detector.

12. The radar device according to claim 10, wherein the rearrangement processor compensates for a phase of selected ranging target bins in accordance with a difference in transmission start time among the respective transmission signals transmitted in time division manner from the transmission radar and a velocity of the candidate for the target detected by the target candidate detector, and rearranges each of the ranging target bins after phase compensation.

* * * * *